(12) United States Patent
Diez

(10) Patent No.: US 7,740,972 B2
(45) Date of Patent: *Jun. 22, 2010

(54) FUEL CELL UNIT AND COMPOSITE BLOCK OF FUEL CELLS

(75) Inventor: Armin Diez, Lenningen (DE)

(73) Assignee: ElringKlinger AG, Dettingen (DE)

( * ) Notice: Subject to any disclaimer, the term of this patent is extended or adjusted under 35 U.S.C. 154(b) by 1442 days.

This patent is subject to a terminal disclaimer.

(21) Appl. No.: 11/060,189

(22) Filed: Feb. 17, 2005

(65) Prior Publication Data

US 2005/0233196 A1    Oct. 20, 2005

Related U.S. Application Data

(62) Division of application No. 10/135,184, filed on Apr. 29, 2002, now Pat. No. 6,875,533.

(30) Foreign Application Priority Data

| Jul. 19, 2001 | (DE) | ................. 101 35 334 |
| Apr. 23, 2002 | (EP) | ................. 02008287 |

(51) Int. Cl.
H01M 2/14 (2006.01)

(52) U.S. Cl. .............................. 429/38; 429/34; 429/35

(58) Field of Classification Search ....................... None
See application file for complete search history.

(56) References Cited

U.S. PATENT DOCUMENTS

| 4,942,099 A | 7/1990 | Isobe et al. .................... 429/35 |
| 5,116,696 A | 5/1992 | Barp ............................ 429/26 |
| 5,595,833 A | 1/1997 | Gardner et al. ................ 429/19 |
| 5,795,665 A | 8/1998 | Allen ........................... 429/12 |
| 6,344,290 B1 | 2/2002 | Bossel .......................... 429/38 |
| 6,479,177 B1* | 11/2002 | Roberts et al. ................ 429/13 |
| 6,613,468 B2 | 9/2003 | Simpkins et al. .............. 429/34 |

FOREIGN PATENT DOCUMENTS

| CA | 2 331 740 | 11/1999 |
| DE | 198 21 767 A1 | 11/1999 |
| DE | 100 44 703 A1 | 4/2002 |
| DE | 101 16 046 A1 | 10/2002 |
| DE | 101 25 777 A1 | 12/2002 |
| EP | 0 437 175 A | 7/1991 |
| WO | 98/35398 A | 8/1998 |
| WO | WO99/54131 | 10/1999 |

* cited by examiner

Primary Examiner—Alexa D. Neckel
Assistant Examiner—Cynthia Lee

(57) ABSTRACT

In order to provide a fuel cell unit, comprising a housing which limits at least one gas chamber and has a gas opening in a first housing wall and a gas opening in a second housing wall located opposite the first housing wall, the housing of which has an adequate deformation stability in relation to the sealing surface pressure required for a flat seal even at high temperatures, it is suggested that the fuel cell unit comprise at least one supporting element which is arranged between the first housing wall and the second housing wall and keeps the two housing walls at a distance from one another.

31 Claims, 19 Drawing Sheets

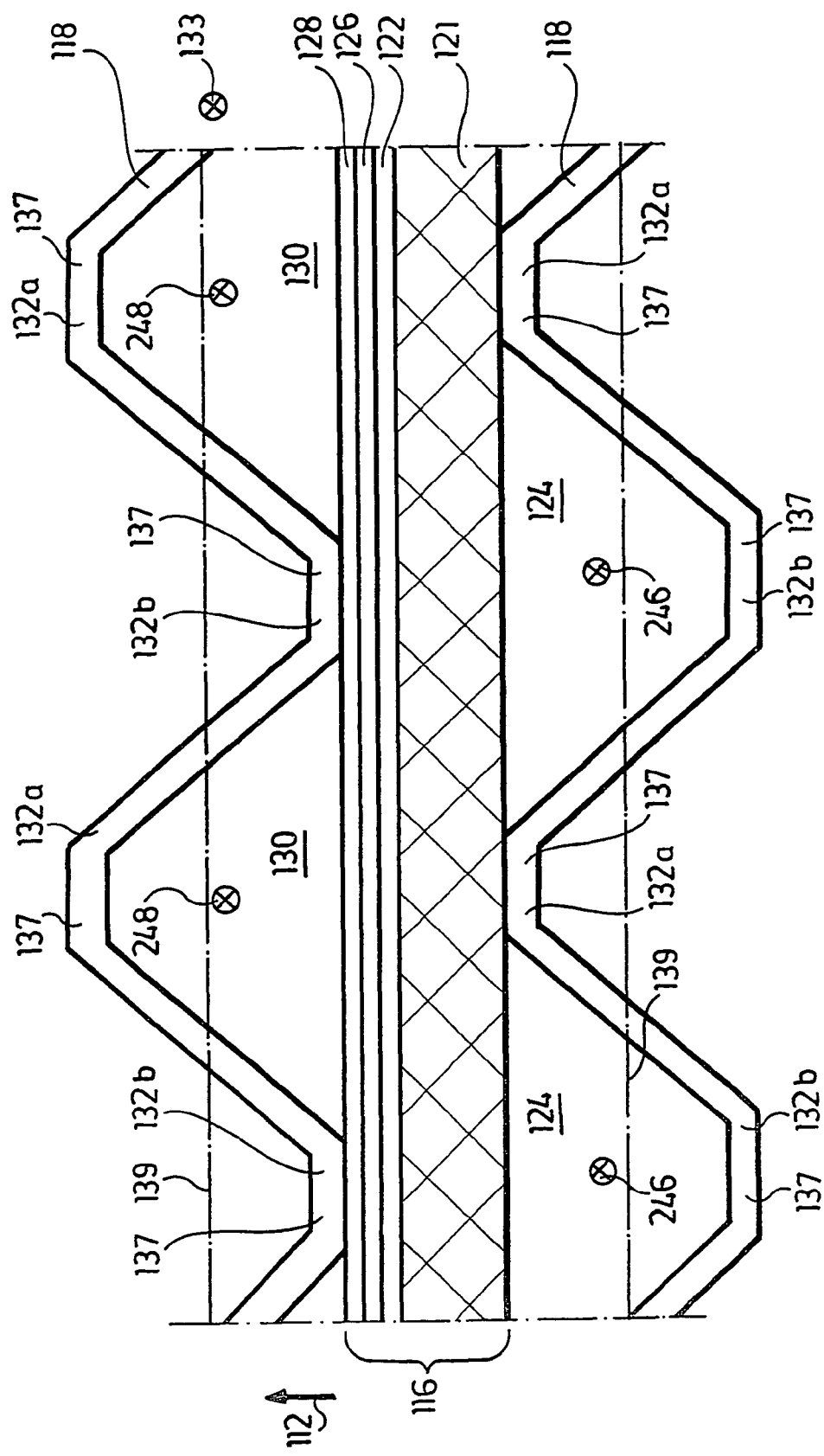

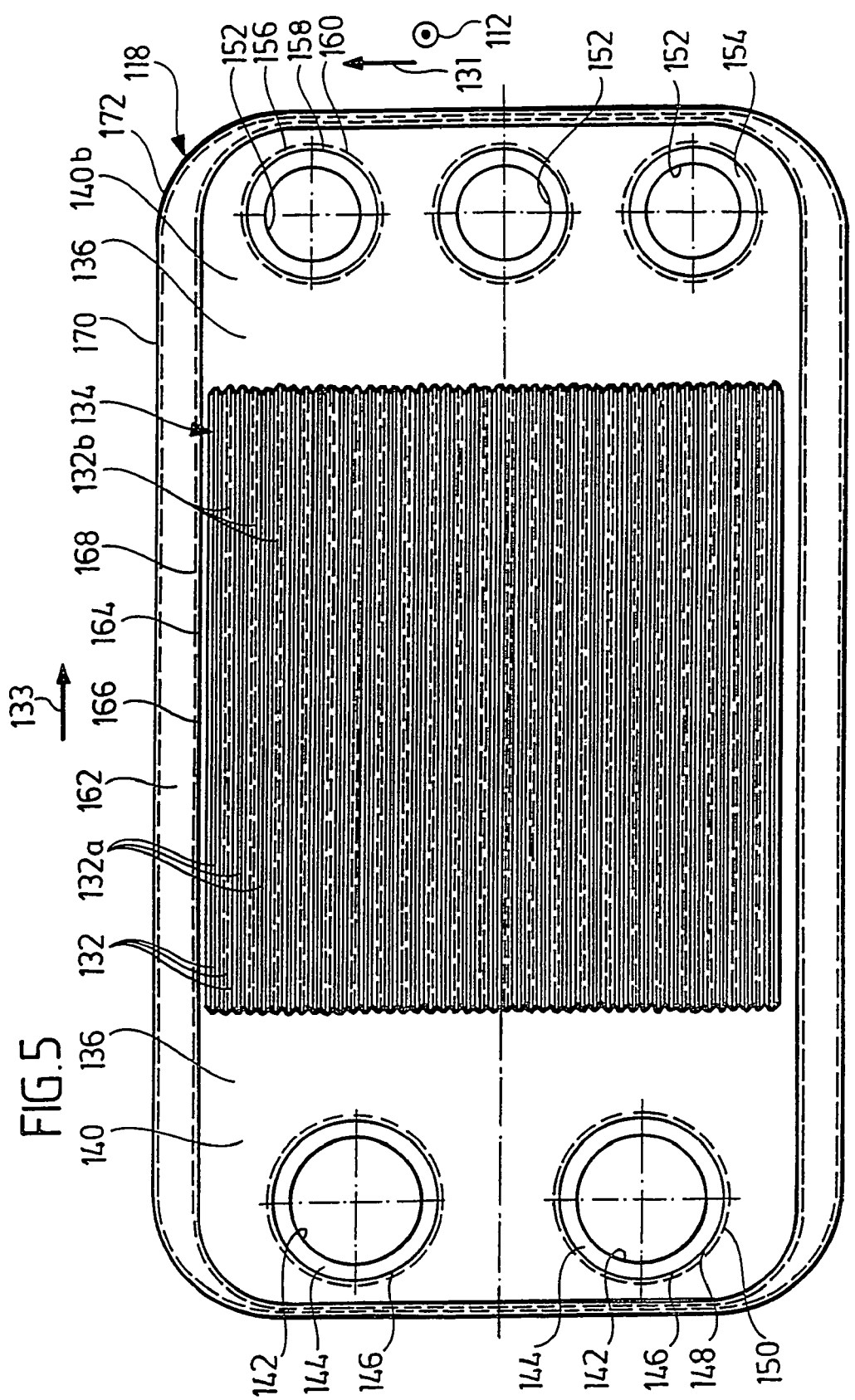

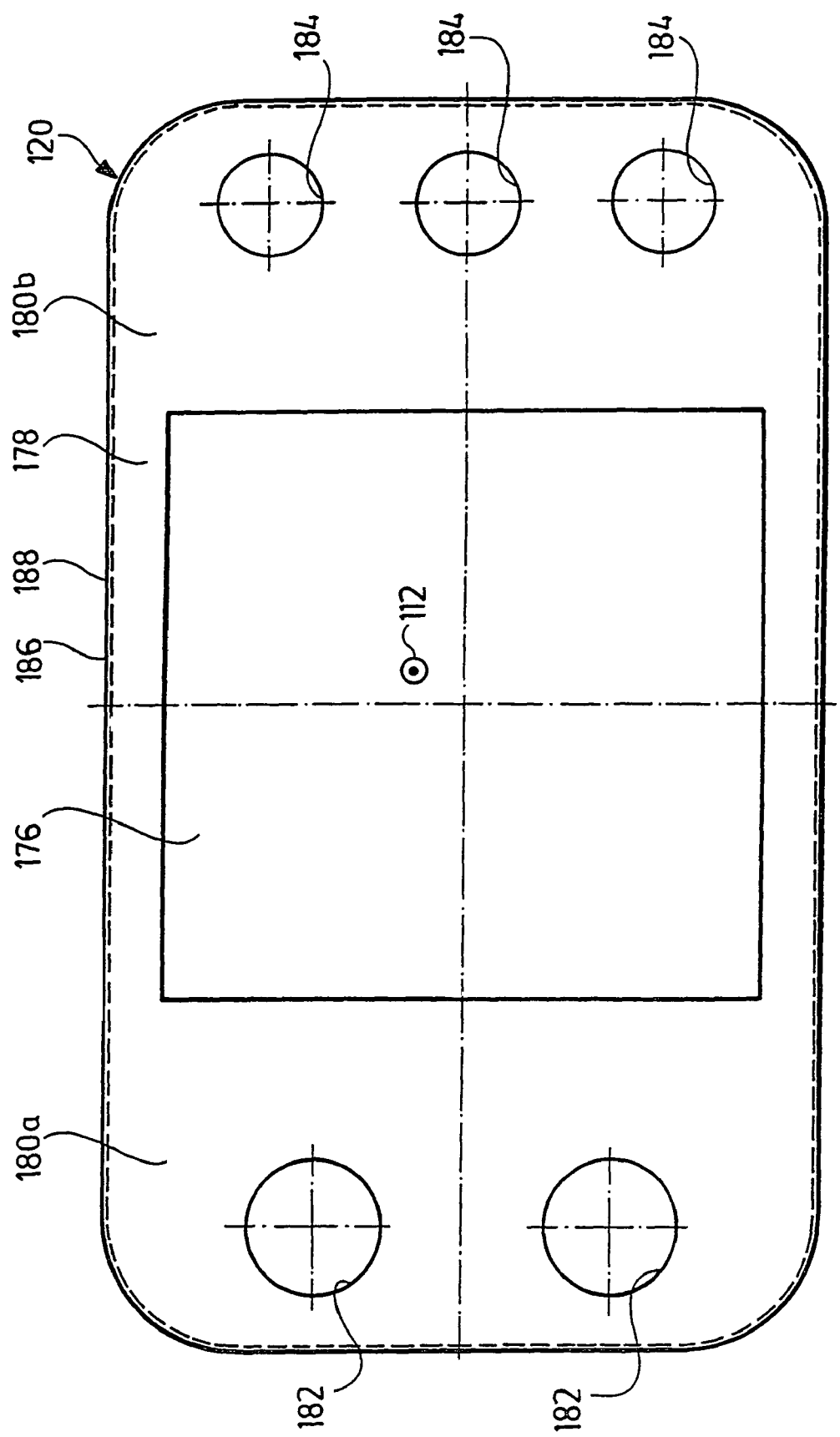

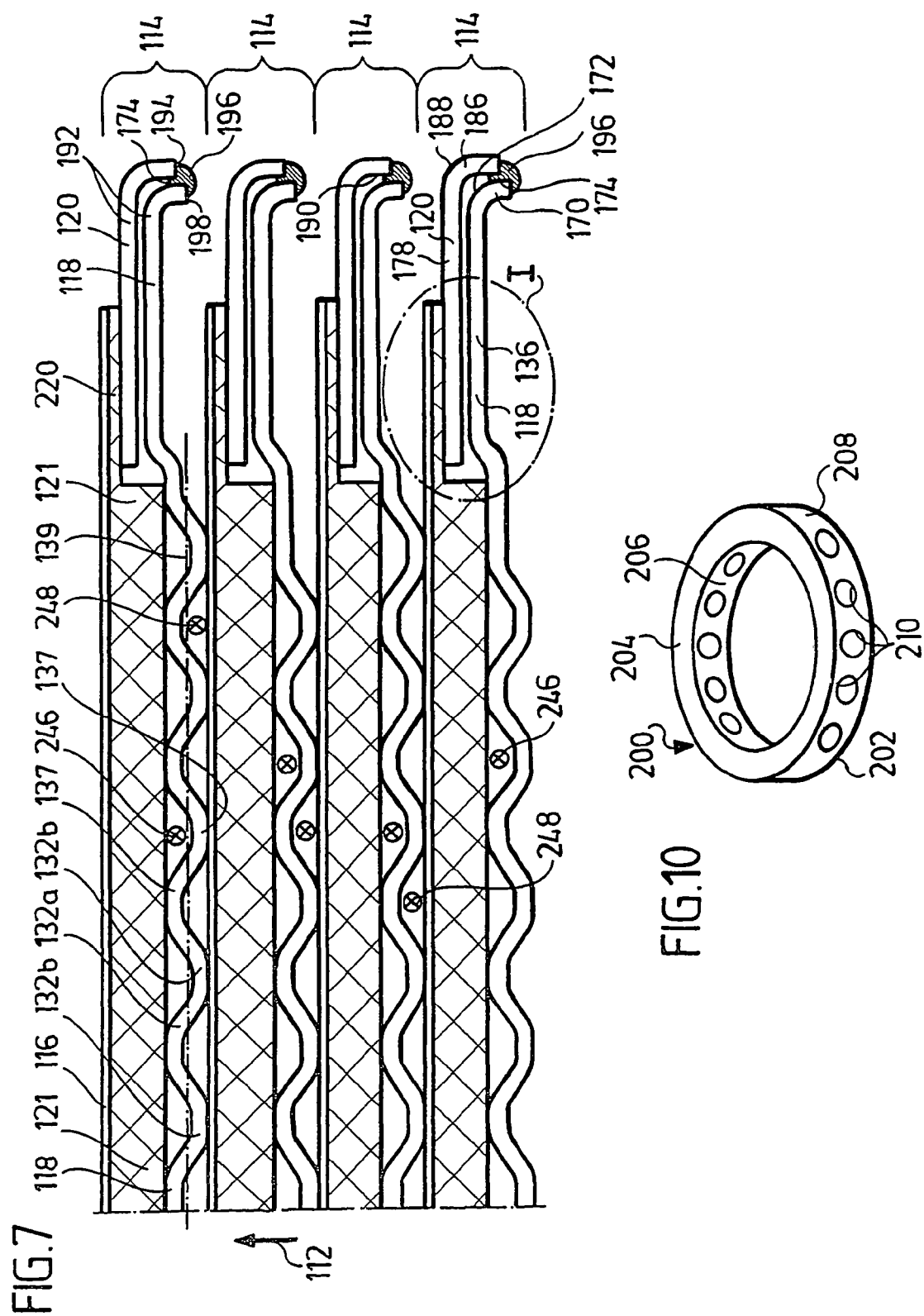

FUEL CELL UNIT AND COMPOSITE BLOCK OF FUEL CELLS

This application is a division of U.S. Ser. No. 10/135,184 filed Apr. 29, 2002, now U.S. Pat. No. 6,875,533, and claims priority and benefits thereof.

The present invention relates to a fuel cell unit which comprises a housing which limits at least one gas chamber and has a gas opening in a first housing wall and a gas opening in a second housing wall located opposite the first housing wall.

Such fuel cell units are known from the state of the art.

In general, several such fuel cell units are combined to form a composite block of fuel cells, in which the fuel cell units follow one another along a stacking direction.

In a cathode-anode-electrolyte unit of such a fuel, cell unit, an electrochemical reaction takes place during operation thereof, during the course of which electrons are released at the anode of the CAE unit and these are supplied to the cathode of the CAE unit for ionizing oxygen atoms via an external electric circuit. Contact plates arranged between the CAE units of two consecutive fuel cell units serve for equalizing the charge between the cathode of one fuel cell unit and the anode of the adjacent fuel cell unit in order to supply the electrons required for the ionization to the cathode. Electrical charges may be tapped from the contact plates located at the edges of the composite block of fuel cells in order to supply them to an external power circuit.

In order to seal the gas chamber limited by the housing, for example, a combustible gas chamber of the fuel cell unit in a gas-tight manner in relation to an additional gas chamber, for example, a chamber for oxidizing agent adjoining the housing, it is necessary to provide sealing elements, for example, flat seals on the housing in the area of the gas openings.

So that the flat seals can develop an adequate sealing effect, they must be acted upon with an adequate sealing surface pressure. This sealing surface pressure is generated, for example, by means of a tensioning device which tensions the flat seals adjoining the housing against the housing walls.

If several fuel cell units are combined to form a composite block of fuel cells, a tensioning device can be provided, with which the areas of the housing of the fuel cell units having the gas openings are tensioned towards one another.

The sealing surface pressure required for the tightness of the flat seals must be absorbed by the housing of the fuel cell unit as free from deformation as possible. This is difficult, in particular, when the fuel cell unit is operated at a high temperature, at which the material of the housing walls has only a low rigidity. For example, so-called high-temperature fuel cell units, which can be operated without any external reformer directly with a hydrocarbonaceous combustible gas, such as, for example, methane or natural gas, or, alternatively hereto, using an external reformer with a hydrocarbonaceous combustible gas, such as, for example, methane, natural gas, diesel fuel or gasoline, are operated at temperatures in the range of approximately 800° C. to approximately 1000° C. At these temperatures, the yield point of steel decreases to values below 10 N/mm$^2$ which is far below the sealing surface pressure required for a flat seal and so a housing produced from steel would be pressed together at these temperatures due to the tensioning force exerted by the tensioning device.

The object underlying the present invention is therefore to provide a fuel cell unit of the type specified at the outset, the housing of which has an adequate deformation stability in relation to the sealing surface pressure required for a flat seal even at high temperatures.

This object is accomplished in accordance with the invention, in a fuel cell unit having the features of the preamble to claim 1, in that the fuel cell unit comprises at least one supporting element which is arranged between the first housing wall and the second housing wall and keeps the two housing walls at a distance from one another.

The idea underlying the inventive solution is, therefore, to prevent any deformation of the housing walls located opposite one another on account of the sealing surface pressure, with which the housing is acted upon, in that the housing walls located opposite one another is prevented by a supporting element which is arranged in the interior of the housing, absorbs the sealing surface pressure, with which the housing is acted upon, and serves as a spacer element which prevents any compression of the housing so that a sealing force required for an adequate sealing effect of the flat seals can be introduced.

On account of the deformation stability of the housing which is increased by the at least one supporting element, the deformation stability inherent in the material of the housing walls is no longer of importance and so a material can be used as material of the housing walls, which can be easily deformed at the high operating temperatures of a high-temperature fuel cell unit and from which the components of the housing can, however, be produced in a particularly simple manner, such as, for example, steel, in particular, high-grade steel.

The inventive construction of the fuel cell unit, in particular, allows the housing of the fuel cell unit to be formed from sheet-metal molded parts which are produced by means of one or more forming procedures, for example, by embossing and/or deep drawing from sheet metal, in particular, from a sheet of high-grade steel resistant to high temperatures or from sheet steel coated with an inorganic or ceramic material.

The thickness of the sheet material used is preferably at the most approximately 3 mm, in particular, at the most approximately 1 mm.

In a preferred development of the invention it is provided for the supporting element to be designed so as to be closed in the shape of a ring and be provided with gas openings in order to facilitate a transport of gas from the gas openings in the housing walls to an area in the interior of the housing which is separated from the gas openings by the supporting element and/or a transport of gas out of the specified area of the interior of the housing to the gas openings.

In order to make the passage of gas between an interior of the supporting element and an exterior of the supporting element possible, the supporting element may comprise at least two channel limiting elements, between which a gas channel is formed.

Furthermore, a carrier element may be provided, on which the channel limiting elements abut in the assembled state of the supporting element and which forms an edge of the gas channel.

The channel limiting elements may be designed, for example, as tongues connected in one piece to the carrier element.

However, it is also possible for one or both of the channel limiting elements to be produced separately from the carrier element and, subsequently, be secured to the carrier element, for example, by means of welding.

Moreover, it may be provided for one or both of the channel limiting elements to be secured to a second carrier element and/or be formed in one piece with the second carrier element.

The second carrier element may be formed in one piece with the first carrier element and/or be formed in one piece with the first carrier element.

The second carrier element may form an edge of the gas channel, preferably on its side located opposite the first carrier element.

In a preferred development of the inventive supporting element it is provided for the supporting element to comprise at least one carrier element and at least one tongue which is formed in one piece with the carrier element and is bent out of the plane of the carrier element in the assembled state of the supporting element.

Such a supporting element is, in particular, simple and inexpensive to produce. Furthermore, such supporting elements may be produced in a ring shape with an optionally small inner ring diameter.

In a particularly preferred development of the invention, it is provided for the carrier element to be designed as an essentially flat plate.

In order to obtain a favorable distribution of the surface pressures in the supporting element, it is preferably provided for the at least one tongue to abut on the carrier element, preferably in an areal manner, in the assembled state of the seal.

In order to make a passage of gas through the supporting element possible, it is advantageously provided for the supporting element to have at least one gas opening and for the at least one tongue to form an edge of such a gas opening in the assembled state of the supporting element.

In preferred developments of the invention, the at least one carrier element is provided with several tongues.

The carrier element can be designed, in particular, as a closed ring.

The at least one tongue of the carrier element can be arranged on the inner ring side or on the outer ring side of the carrier element.

In order to be able to achieve a greater height of the supporting element, it is advantageously provided for the supporting element to comprise at least two carrier elements.

These carrier elements may be connected to one another, in particular, in one piece.

In a preferred development of the supporting element it is provided for the at least two carrier elements to be connected to one another via an area which is bent, preferably in the shape of a U, in the assembled state of the supporting element.

Alternatively or in addition hereto, it may be provided for the supporting element to comprise a first carrier element with a first tongue and a second carrier element with a second tongue, wherein the first tongue and the second tongue border on one another.

In order to achieve a favorable distribution of pressure in the supporting element when finally assembled, it is preferably provided for the tongues of at least two carrier elements to abut on one another, preferably in an areal manner, in the assembled state of the supporting element.

In order to use material in an optimum manner and for reasons of production techniques, it is of advantage when at least one carrier element is formed in one piece with one of the housing walls of the fuel cell unit.

In this case, it is possible to cut the supporting element together with the relevant housing wall from a starting material, for example, sheet steel and to produce the supporting element by way of bending operations and to position it at a gas channel of the fuel cell unit without the supporting element having to be produced separately from the housing wall and, subsequently, combined with the housing wall.

All the punching and bending operations required for the production and positioning of the supporting element can, in this case, be carried out in a follow-on composite tool.

Alternatively hereto, it is, however, also possible to design the supporting element as a part separate from the housing walls and not combine it with the housing walls until during the assembly of the fuel cell unit.

The inventive supporting element may comprise several layers depending on the desired installation thickness, wherein several of these layers are formed from carrier elements closed in the shape of a ring and other layers from tongues arranged on the carrier elements and folded back onto the carrier elements. The tongues may be arranged on the outer ring side or on the inner ring side of the respective carrier element. Furthermore, it is possible for a carrier element to have at least one tongue arranged on its outer ring side as well as at least one tongue formed on its inner ring side.

As a result of the tongues being folded over onto the upper side or underside of the respective carrier element and, subsequently, several carrier elements with the tongues arranged thereon being folded onto one another, multilayered packages result from the starting material, in particular, consisting of sheet steel with channels which are located in the interior and make a flow of gas possible from the inner ring side to the outer ring side of the supporting element formed in this way.

Alternatively to the aforesaid, it may also be provided for a plurality of supporting elements to be provided, between which gas passages are formed in order to make a transport of gas possible between the gas openings and the interior of the housing.

Since the supporting element need not exercise either a sealing function or an electrical insulation function, any material can be used as material for the supporting element which has an adequately high mechanical stability at the operating temperature of the fuel cell unit.

For example, it may be provided for the supporting element to comprise a metallic material.

Alternatively or in addition hereto, it may be provided for the supporting element to comprise a ceramic material, for example, oxide ceramics, in particular, aluminum oxide and/or zirconium oxide.

In a particularly preferred development of the invention it is provided for the supporting element to be designed as a porous sintered element consisting of a ceramic and/or a metallic material.

So that both housing walls of the housing of the fuel cell unit can be supported on the supporting element, it is preferably provided for the supporting element to abut areally not only on the first housing wall but also on the second housing wall located opposite the first housing wall.

The supporting element can be designed as a separate component which is inserted between the first housing wall and the second housing wall during the assembly of the housing of the fuel cell unit.

Alternatively hereto, it may, however, also be provided for at least one part of the supporting element to be formed in one piece with the first housing wall or in one piece with the second housing wall. As a result, the housing can be assembled more quickly.

The supporting element can be produced particularly simply when it is provided for at least one part of the supporting element to be formed by a single or multiple bending of an edge area of the gas opening provided in the first housing wall or of an edge area of the gas opening provided in the second housing wall.

Claim 26 is directed to a composite block of fuel cells which comprises a plurality of inventive fuel cell units which follow one another along the stacking direction of the composite block of fuel cells.

In order to be able to act upon the fuel cell units of the composite block of fuel cells with the sealing surface pressure required for an adequate sealing effect, the composite block of fuel cells advantageously comprises a tensioning device, with which the areas of the housing of the fuel cell units having the gas openings can be tensioned towards one another.

In a preferred development of the inventive composite block of fuel cells, it is provided for the same to comprise an additional tensioning device, with which additional areas of the housing of the fuel cell units can be tensioned towards one another independently of the tensioning of the areas of the fuel cell units having the gas openings. This makes it possible to act upon different areas of the housing of the fuel cell units with different surface pressures.

It may be provided, in particular, for cathode-anode-electrolyte units and contact plates, which are in electrically conductive contact with the cathode-anode-electrolyte units, to be tensioned towards one another by means of the additional tensioning device. As a result, it is possible to adjust the contact pressure, with which the contact elements of the contact plates are pressed against the contact surfaces of the cathode-anode-electrolyte units of the fuel cell units—and thus an elastic deformation of these contact elements—independently of the sealing surface pressure, with which the flat seals are acted upon at the gas openings of the fuel cell units, to an optimum value.

Additional features and advantages of the invention are the subject matter of the following description and drawings illustrating embodiments. In the drawings:

FIG. 4 shows a schematic longitudinal section through a cathode-anode-electrolyte unit with contact plates bordering thereon;

FIG. 5 shows a schematic plan view of a contact plate of a fuel cell unit;

FIG. 6 shows a schematic plan view of a fluid guide frame of a fuel cell unit;

FIG. 7 shows the right-hand part of a schematic cross section through four fuel cell units following one another in the stacking direction of the composite block of fuel cells;

FIG. 10 shows a schematic, perspective illustration of a ring-shaped supporting element of a fuel cell unit surrounding a gas channel;

The same or functionally equivalent elements are designated in all the Figures with the same reference numerals.

A fuel cell device designated as a whole as 100 and illustrated in FIGS. 1 to 12 comprises an essentially parallelepiped housing 102 (cf. FIG. 1), into which a supply line 104 for oxidizing agent opens, via which an oxidizing agent, for example, air or pure oxygen is supplied to the interior of the housing 102 from a supply blower (not illustrated) at an overpressure of, for example, approximately 50 mbar.

Furthermore, a discharge line 105 for oxidizing agent opens into the housing 102 and superfluous oxidizing agent can be removed from the interior of the housing 102 via this line.

Figure 1:
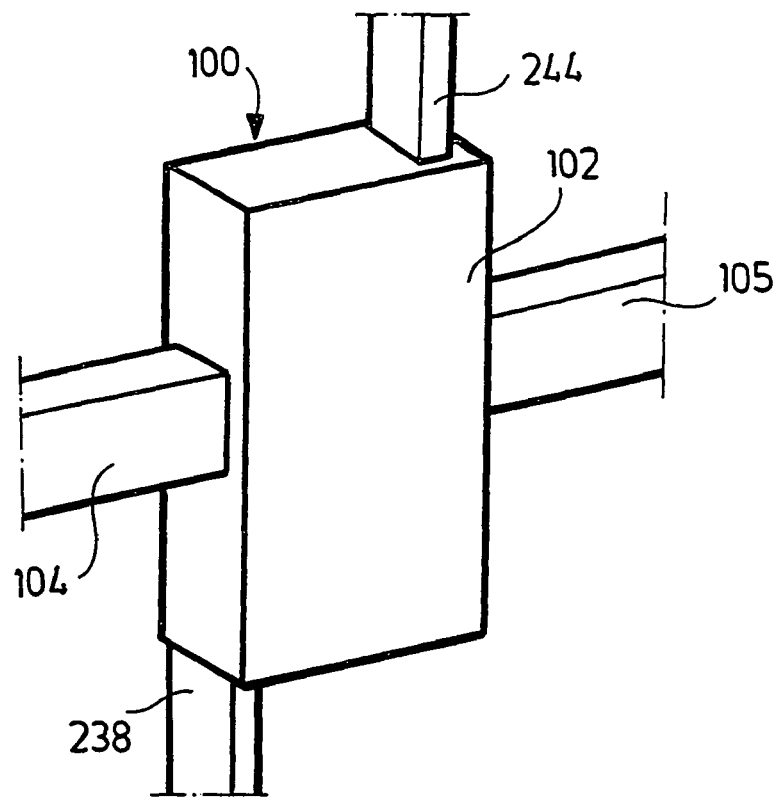
FIG. 1 shows a schematic perspective illustration of a fuel cell device with supply lines and discharge lines for the oxidizing agent and the fuel gas.
Figure 3:
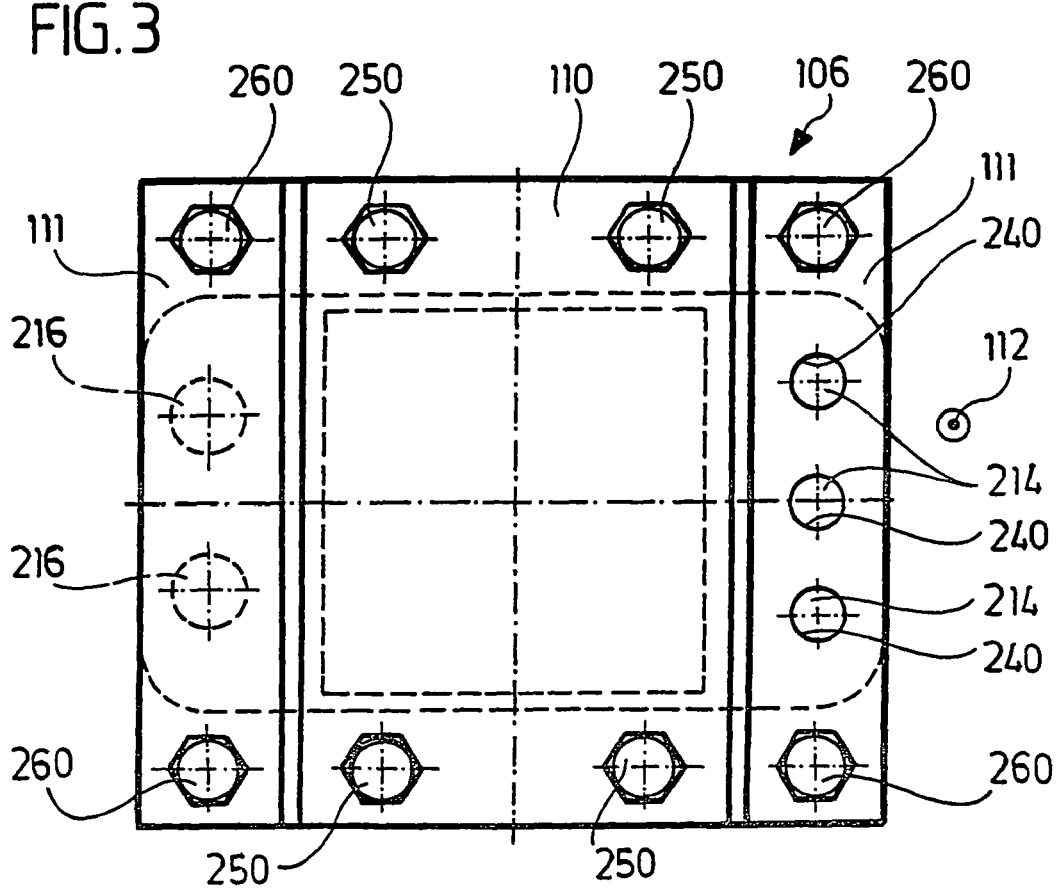
FIG. 3 shows a plan view from above of end plates of the composite block of fuel cells from FIG. 2.
Figure 2:
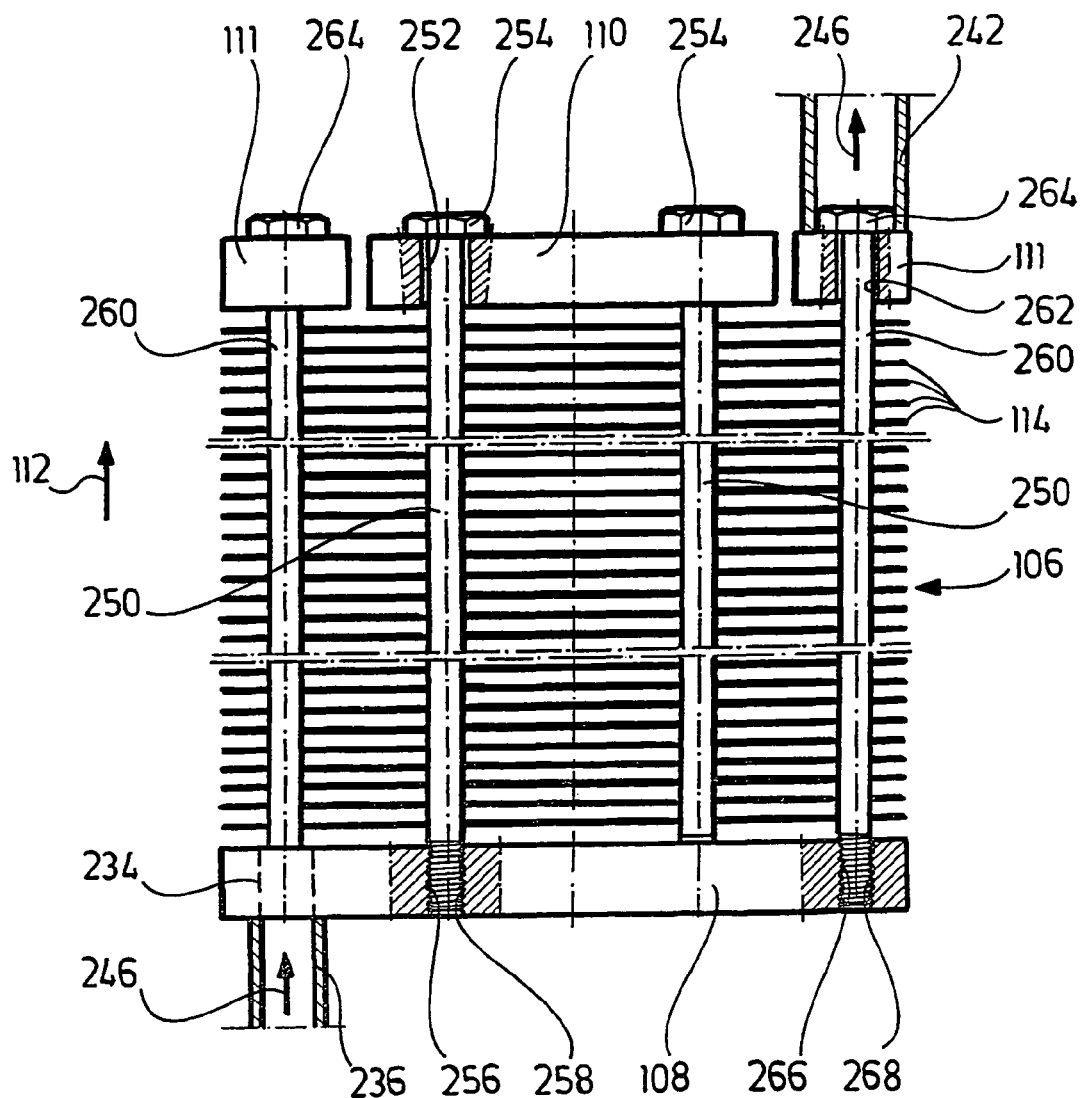
FIG. 2 shows a schematic vertical section through a composite block of fuel cells arranged in the housing of the fuel cell device from FIG. 1.

A composite block of fuel cells 106 illustrated as a whole in FIGS. 2 and 3 is arranged in the interior of the housing 102 and comprises a lower end plate 108, a central, upper end plate 110, two lateral, upper end plates 111 and a plurality of fuel cell units 114 arranged between the lower end plate 108 and the upper end plates 110, 111 and following one another along a stacking direction 112.

As is best apparent from FIG. 12, which shows a perspective, exploded illustration of two fuel cell units 114 following one another along the stacking direction 112, each of the fuel cell units 114 comprises an essentially plate-like cathode-anode-electrolyte unit 116 (designated in the following in brief as CAE unit) which is held between a contact plate 118 and a fluid guide frame 120.

The CAE unit 116 comprises, as illustrated purely schematically in FIG. 4, an electrically conductive substrate 121 which is permeable to gas and can be designed, for example, as a metal wire cloth, metal wire fleece, metal wire fabric, metal wire mesh or as a porous member consisting of sintered or pressed metal particles, wherein a combustible gas can pass through the substrate 121 from a combustible gas chamber 124 bordering on the substrate 121.

Furthermore, the CAE unit 116 comprises a plate-like anode 122 arranged on the substrate 121 and consisting of an electrically conductive ceramic material, for example, Ni—$ZrO_2$ ceramet (ceramics-metal mixture) which is porous in order to enable the combustible gas from the combustible gas chamber 124 to pass through the anode 122 to the electrolyte 126 bordering on the anode 122.

A hydrocarbonaceous gas mixture or pure hydrogen can be used, for example, as combustible gas.

The electrolyte 126 is preferably designed as a solid-state electrolyte and formed, for example, from an yttrium-stabilized zirconium dioxide.

On the side of the electrolyte 126 located opposite the anode 122, a plate-like cathode 128 borders on the same and this is formed from an electrically conductive ceramic material, for example, from $LaMnO_3$ and has a porosity in order to make it possible for an oxidizing agent, for example, air or pure oxygen to pass to the electrolyte 126 from a chamber 130 for oxidizing agent bordering on the cathode 128.

The electrolyte 126 is essentially gas-tight so that no oxidizing agent can pass from the chamber 130 for oxidizing agent through the electrolyte 126 into the combustible gas chamber 124 and no combustible gas can pass from the combustible gas chamber 124 through the electrolyte 126 into the chamber 130 for oxidizing agent.

During operation of the fuel cell device, the CAE unit 116 of each fuel cell unit 114 has a temperature of, for example, approximately 850° C., at which the electrolyte 126 is conductive for oxygen ions. The oxidizing agent from the chamber 130 for oxidizing agent absorbs electrons at the anode 122 and releases to the electrolyte 126 bivalent oxygen ions which migrate through the electrolyte 126 to the anode 122. The combustible gas from the combustible gas chamber 124 is oxidized at the anode 122 by the oxygen ions from the electrolyte 126 and thereby releases electrons to the anode 122.

The contact plates 118 serve to remove the electrons released during the reaction at the anode 122 from the anode 122 via the substrate 121 or to supply the electrons required for the reaction at the cathode 128 to the cathode 128.

For this purpose, each of the contact plates 118 consists of sheet metal with a good electrical conductivity which (as is best apparent from FIG. 5) is provided with a plurality of contact elements 132 which have, for example, the shape of ribs which extend in the longitudinal direction 133 of the contact plate 118 and follow one another in the transverse direction 131 of the contact plate 118, wherein the contact elements 132 following one another in the transverse direction 131 border directly on one another and project alternatingly to different sides of the contact plate 118 from the central plane 139 of the contact plate 118. The contact elements on the anode side which project upwards from the contact plate 118 and, therefore, to the anode 122 of the CAE unit 116 belonging to the same fuel cell unit 114 are designated with the reference numeral 132*a*, the contact elements on the cathode side which project downwards from the contact plate 118 and, therefore, to the cathode 128 of the CAE unit 116 belonging to an adjacent fuel cell unit 114 with the reference numeral 132*b*.

Each of the contact elements 132 has a central, strip-like contact area 137, at which it is in electrically conductive contact with an adjacent CAE unit 116 (cf., in particular, FIG. 4 and FIG. 7).

The contact areas 137 of the contact elements 132*a* of a contact plate 118 on the anode side are in electrical surface contact with the substrate 121 and, therefore, with the anode 122 of the CAE unit 116 belonging to the same fuel cell unit 114 so that electrons can pass from the respective anode 122 to the contact plate 118.

The contact elements 132*b* of the contact plates 118 on the cathode side are each in electrically conductive surface contact with the cathode 128 of the CAE unit 116 belonging to an adjacent fuel cell unit 114 so that electrons can pass from the contact plate 118 to the cathode 128. In this way, the contact plates 118 facilitate the balancing of a charge between the anodes 122 and the cathodes 128 of CAE units 116 following one another along the stacking direction 112.

The contact plates 118 arranged at the ends of the composite block of fuel cells 106 are (in a manner not illustrated in the drawings) connected to an external power circuit in order to tap the electrical charges resulting at these contact plates 118 located at the edges.

The contact field 134 of each contact plate 118 formed from the contact elements 132 has the structure of corrugated sheet metal corrugated in the transverse direction 131 of the contact plate 118.

As is best apparent from the plan view of FIG. 5, the central, essentially rectangular contact field 134 of each contact plate 118, which is provided with the contact elements 132, is embedded into a flat, essentially rectangular gas guiding area 136 of the contact plate 118.

The gas guiding area 136 has a respective side area 140*a* and 140*b* on either side of the contact field 134.

Several, for example, two essentially circular combustible gas openings 142 are formed in the side area 140*a*.

Each of the combustible gas openings 142 is surrounded by a ring-shaped edge area 144, wherein each of the areas 142 is offset downwards along the stacking direction 112 in relation to the gas guiding area 136 and is connected to the gas guiding area 136 via a slanting surface 146 which borders on the respective edge area 144 at an inner bending line 148 and on the gas guiding area 136 along an outer bending line 150.

The combustible gas openings 142 serve for the passage of combustible gas to be supplied to the fuel cell units 114 through the respective contact plate 118.

The side area 140*b* of each contact plate 118 located opposite the side area 140*a* is provided with several, for example, with three essentially circular exhaust gas openings 152.

Figure 8:
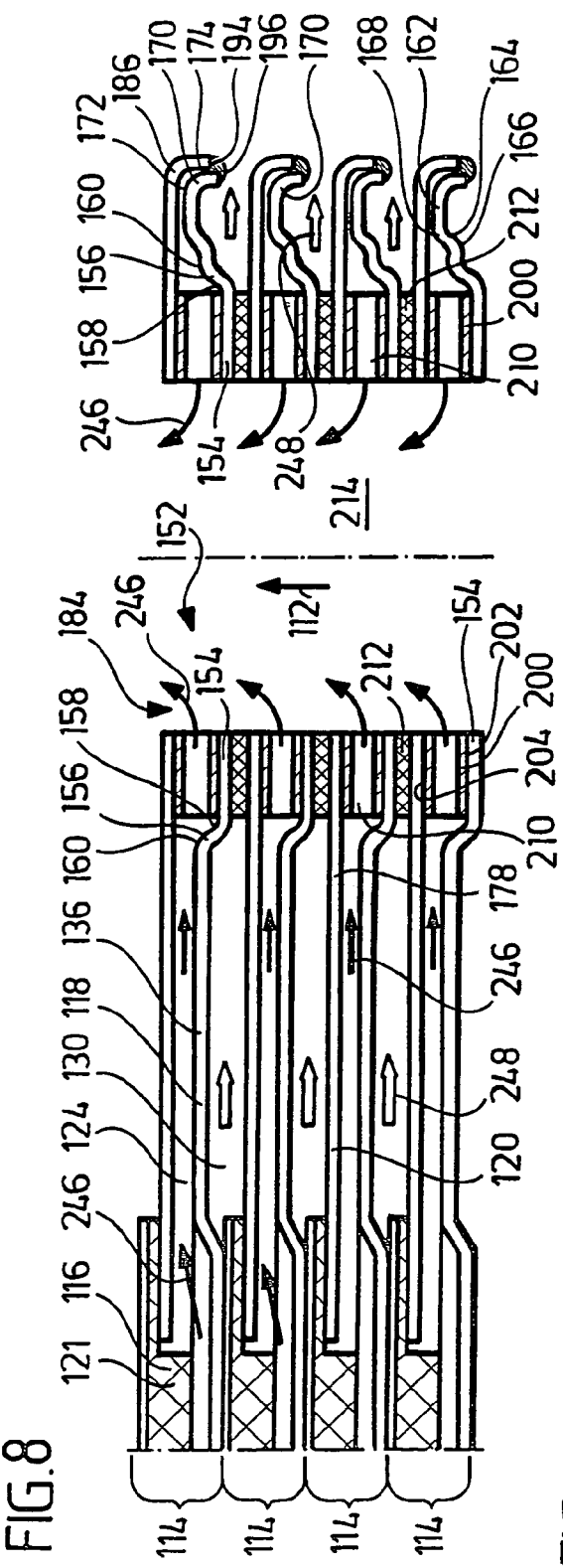
FIG. 8 shows the right-hand part of a schematic longitudinal section through four fuel cell units following one another along the stacking direction of the composite block of fuel cells in the region of a gas channel.

Each of the exhaust gas openings 152 is surrounded by a ring-shaped edge area 154 which is offset downwards along the stacking direction 112 in relation to the gas guiding area 136 of the contact plate 118 and is connected to the gas guiding area 136 via a slanting surface 156 which borders on the edge area 154 at an inner bending line 158 and on the gas guiding area 136 along an outer bending line 160, to the gas guiding area 136 (cf., in particular, FIG. 8).

The exhaust gas openings 152 of the contact plate 118 facilitate the passage of exhaust gas, which is to be discharged from the fuel cell units 114 and contains superfluous combustible gas and products of combustion, in particular, water, through the contact plate 118.

Furthermore, each contact plate 118 is provided with an edge area 162 which surrounds the gas guiding area 136 and is aligned at right angles to the stacking direction 112, is offset upwards along the stacking direction 112 in relation to the gas guiding area 136 and is connected to the gas guiding area 136 via a slanting surface 164 which borders on the gas guiding area 136 along an inner bending line 166 and on the edge area 162 along an outer bending line 168.

The outer edge of the edge area 162 is provided with a connecting flange 170 which borders on the edge area 162 along a bending line 172 and extends downwards from the edge area 162 essentially parallel to the stacking direction 112.

The outer surface of the connecting flange 170, which is aligned essentially parallel to the stacking direction 112, forms a first connecting surface 174.

Each of the contact plates 118 is designed as a sheet-metal molded part which is formed from an essentially flat, essentially rectangular sheet-metal layer by means of embossing and/or deep drawing as well as by punching or cutting out the combustible gas openings 142 and the exhaust gas openings 152.

The fluid guide frames 120 are also formed as sheet-metal molded parts from an essentially flat, essentially rectangular sheet-metal layer.

As is best apparent from FIG. 6, each fluid guide frame 120 has an essentially rectangular, central opening 176 for the passage of the CAE unit 116 of the same fuel cell unit 114.

This opening 176 is surrounded by an essentially flat gas guiding area 178 which is aligned at right angles to the stacking direction 112 and comprises two side areas 180$a$, 180$b$ which are located opposite one another at the opening 176.

A plurality, for example, two essentially circular combustible gas openings 182 are formed in the side area 180$a$ and these facilitate the passage of combustible gas through the fluid guide frame 120.

Several, for example, three essentially circular exhaust gas openings 184 are formed in the side area 180$b$ of the gas guiding area 178 located opposite the side area 180$a$ and these facilitate the passage of exhaust gas to be discharged from the fuel cell units 114 through the fluid guide frame 120.

The gas guiding area 178 of each fluid guide frame 120 is provided at its outer edge with a connecting flange 186 which borders on the gas guiding area 178 along a bending line 188 and extends downwards from the gas guiding area 178 essentially parallel to the stacking direction 112.

The inner side of the connecting flange 186 aligned essentially parallel to the stacking direction 112 forms a second connecting surface 190.

A respective fluid guide frame 120 and a respective contact plate 118 together form a housing 192 of a fuel cell unit 114.

Figure 9:
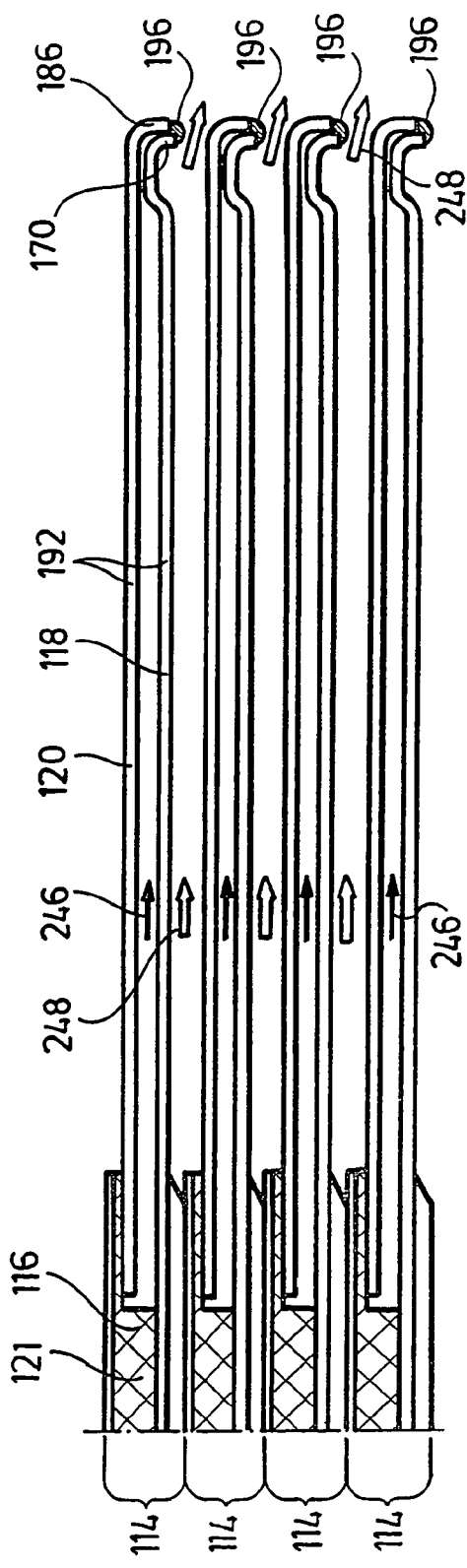
FIG. 9 shows the right-hand part of a schematic longitudinal section through four fuel cell units following one another along the stacking direction of the composite block of fuel cells in the region between two gas channels.

As is apparent from FIGS. 7 to 9, the fluid guide frame 120 and the contact plate 118 of such a housing 192 of a fuel cell unit 114 are secured to one another at their connecting flanges 186 and 170, respectively, and sealed against one another so as to be gas-tight.

In this respect, the connecting flange 186 of the fluid guide frame 120 which is aligned essentially parallel to the stacking direction 112 overlaps the connecting flange 170 of the contact plate 118 which is likewise aligned essentially parallel to the stacking direction 112 in such a manner that the first connecting surface on the connecting flange 170 of the contact plate 118 and the second connecting surface 190 on the connecting flange 186 of the fluid guide frame 120 are located opposite one another.

As is apparent from FIGS. 7 to 9, the lower edge 194 and the second connecting surface 190 of the connecting flange 186 of the fluid guide frame 120 are connected by means of a welding seam 196 to the first connecting surface 174 and at the lower edge 198 of the connecting flange 170 of the contact plate 118 and are thus secured to the connecting flange 170 of the contact plate 118.

In this respect, the welding seam 196 extending along the edges of the contact plate 118 and the fluid guide frame 120 provides for a gas-tight closure of the space between the connecting flanges 186 and 170.

The welding seam 196 can, for example, be produced with a laser welding process or with an electron beam process.

Alternatively or in addition to a weld, the connection between the connecting flanges 186 and 170 can also be brought about by soldering, in particular, by a hard soldering.

Due to the fact that the connecting flanges 186 and 170 and, in particular, the connecting surfaces 174 and 190 located opposite one another are aligned parallel to the stacking direction 112, the contact plate 118 is accommodated in a type of sliding seat in the fluid guide frame 120 so that the connecting flanges 186 and 170 can be connected to one another in a gas-tight manner without any problem even when the distance between the lower edges 194 and 198 varies along the stacking direction 112 on account of production tolerances during the production of the contact plate 118 and of the fluid guide frame 120 or on account of assembly tolerances during the assembly of the fuel cell unit 114 along the edge of the contact plate 118 and the edge of the fluid guide frame 120.

As is best apparent from FIG. 8, ring-shaped supporting elements 200 are arranged in the area of the exhaust gas openings 152, 184 and abut with their underside 202 on the respective upper side of an edge area 154 of a contact plate 118 surrounding an exhaust gas opening 152 and with their upper side 204 on the respective underside of the area of the fluid guide frame 120 surrounding an exhaust gas opening 184 in the fluid guide frame 120.

Similar supporting elements 200 differing only in their dimensions from the supporting elements 200 at the exhaust gas openings 152, 184 are arranged between the contact plate 118 and the fluid guide frame 120 in the area of the combustible gas openings 142, 182.

Such a supporting element 200 is illustrated in a perspective manner in FIG. 10 and has the shape of a circular ring with an essentially rectangular cross section. In order to make a passage of gas possible from the inner side to the outer side of the supporting element 200 (or in the reverse direction), the supporting element 200 is provided with essentially cylindrical gas channels 210 which are radially aligned, pass through the supporting element 200 from its inner side 206 as far as its outer side 208 and are spaced from one another in the circumferential direction of the supporting element 200.

The supporting elements 200 serve to keep the contact plate 118 and the fluid guide frame 120 of a housing 192 of a fuel cell unit 114 at a distance from one another and thus to prevent any compression of the housing 192 due to the clamping force acting on the housing 192 during the assembly of the composite block of fuel cells 106.

The supporting effect of the supporting elements 200 plays a special part at the operating temperature of the fuel cell device 100 which is, in the case of a high-temperature fuel cell device, in the range of approximately 800° C. to approximately 1000° C. since at such operating temperatures the yield point of the steel, from which the contact plate 118 and the fluid guide frame 120 are formed, drops to values of less than approximately 10 N/mm$^2$ and so slight clamping forces would already be sufficient to press the contact plate 118 and the fluid guide frame 120 of a housing 192 against one another without the presence of the supporting elements 200.

The supporting elements 200 may be formed from a metallic material or from a ceramic material.

Instead of a solid supporting element with gas channels 210, a supporting element can also be used which is formed as a porous sintered element consisting of a ceramic and/or a metallic material. Such a sintered element already has an adequate gas permeability on account of its porosity and so such an element need not be provided with gas channels.

Figure 12:
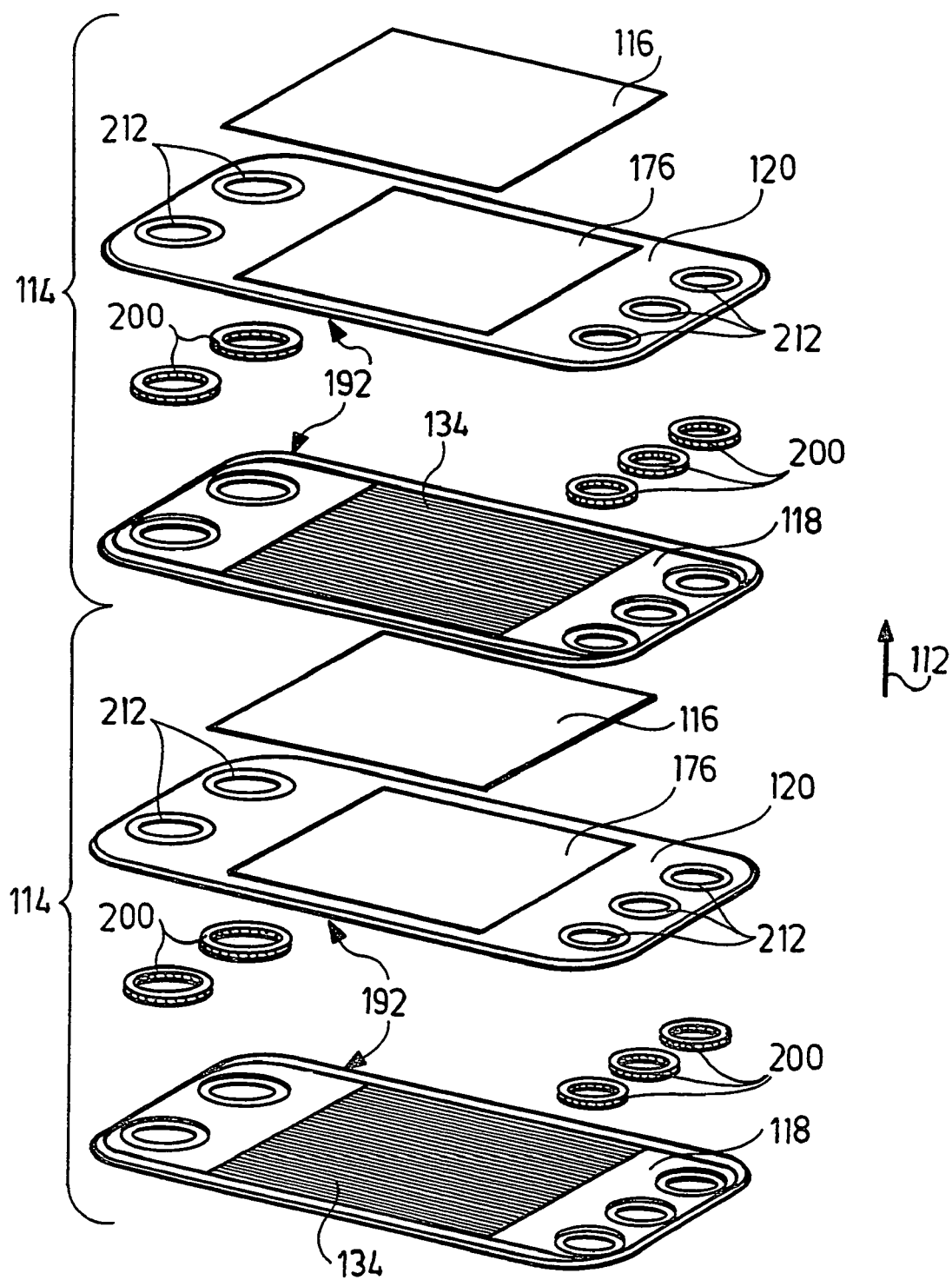
FIG. 12 shows a schematic, perspective, exploded illustration of two fuel cell units following one another in the stacking direction.

As is best apparent from FIGS. 8 and 12, a respective gas channel seal 212 is arranged between the underside of the edge area 154 of each exhaust gas opening 152 in a contact plate 118 and the upper side of the gas guiding area 178 of the fluid guide frame 120 of an adjacent fuel cell unit 114 arranged beneath the relevant contact plate 118 in the stacking direction 112. Each of the gas channel seals 212 seals the space between the adjacent contact plate 118 and the adjacent fluid guide frame 120 in a gas-tight manner and surrounds the respective exhaust gas opening 152, 184 in the contact plate 118 and in the fluid guide frame 120, respectively, in a ring shape.

As is best apparent from FIG. 8, the contact plates 118 and fluid guide frames 120 following one another in the stacking direction 112 limit with the respective supporting elements 200 and gas channel seals 212 arranged therebetween several, for example, three exhaust gas channels 214, which exhaust gas can enter from the combustible gas chambers 124 of the fuel cell units 114 through the gas channels 210 in the supporting elements 200 and which are separated from the chambers 130 for oxidizing agent of the fuel cell units 114 in a gas-tight manner by the gas channel seals 212.

Gas channel seals 212 are also arranged in a corresponding way between the edge areas 144 of the combustible gas openings 142 of each contact plate 118 and the fluid guide frame 120 of a fuel cell unit 114 arranged beneath the relevant contact plate 118 in the stacking direction 112 and surround the combustible gas openings 142 and 182 in the contact plate 118 and in the fluid guide frame 120, respectively, in a ring shape so that the contact plates 118 and fluid guide frames 120 following one another in the stacking direction 112 form together with the respective supporting elements 200 and gas channel seals 212 arranged therebetween several, for example, two combustible gas channels 216 which extend along the stacking direction 112, from which combustible gas can exit through the gas channels 210 in the supporting elements 200 and enter the combustible gas chambers 124 of the fuel cell units 114 and which are separated from the chambers 130 for oxidizing agent of the fuel cell units 114 in a gas-tight manner by the gas channel seals 212.

The gas channel seals 112 can each comprise, for example, a flat seal consisting of mica, in particular, of amber mica.

Alternatively or in addition hereto, it may also be provided for the gas channel seals 212 to each comprise a gas-tight, electrically insulating coating which is applied as a paste with a screen printing process or by means of roller coating onto the surface of the contact plate 118 or onto the surface of the fluid guide frame 120.

Furthermore, the combustible gas chamber 124 of each fuel cell unit 114 is separated from the chamber 130 for oxidizing agent of a fuel cell unit 114 arranged above it in the stacking direction 112 in a gas-tight manner by means of a combustible gas chamber seal 218, the construction of which will be described in detail in the following with reference to FIG. 11.

Figure 11:
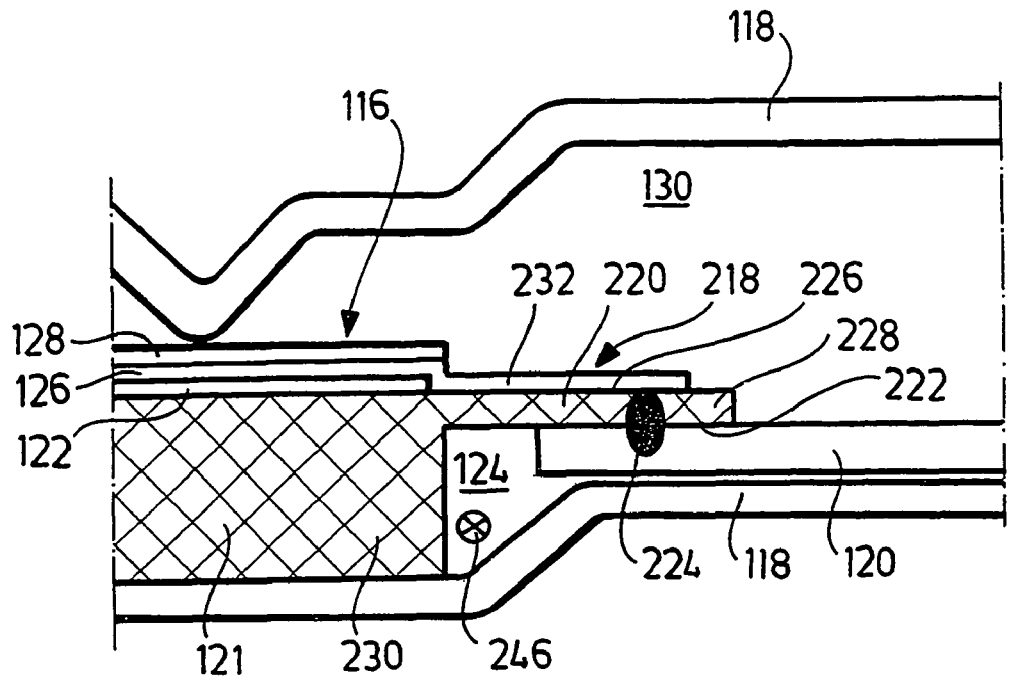
FIG. 11 shows an enlarged illustration of the area I from FIG. 7.

As is apparent from FIG. 11, the substrate 121 of the CAE unit 116 has a compressed outer area 220 which extends along the entire circumference of the substrate 121 and in which the thickness of the substrate 121 has been reduced by a pressing process to, for example, approximately 20% of the initial thickness, i.e., the thickness of the non-pressed area of the substrate 121.

During this compression process, the porosity of the substrate 121, i.e., the percentage proportion of the volume of the substrate 121 filled with gas in relation to the total volume of the substrate 121 is reduced to almost zero in the compressed outer area 220.

In order to achieve this, the thickness in the compressed outer area 220 of a substrate 121 which has a porosity of x % is preferably reduced during the compression process to (100−x)% of the initial thickness; in the case of a porosity of 80%, to 20% of the initial thickness.

The substrate 121 is placed on the fluid guide frame 120 with the underside 222 of the compressed outer area 220 and connected to the metallic material of the fluid guide frame 120 in a gas-tight manner by means of a welding process, for example, by laser welding, electron beam welding, projection welding or condensed discharge welding.

As a result of the welding process, a gas-tight zone 224 which no longer has any porosity is formed in the compressed outer area 220 of the substrate 121, this zone extending from the underside 222 as far as the upper side 226 of the compressed outer area 220 through the compressed outer area 220 of the substrate 121 and forming a gas-tight barrier which extends along the entire circumference of the substrate 121 and prevents any passage of gas from the edge area 228 located outside the gas-tight zone 224 into the inner area 230 of the substrate 121 surrounded by the gas-tight zone 224 and, likewise, any passage of gas in the reverse direction.

Instead of welding the substrate 121 to the fluid guide frame 120, the gas-tight zone 224 in the compressed outer area 220 of the substrate 221 can also be formed by soldering the substrate 121 to the fluid guide frame 120. In this respect, the solder used is drawn into the pores and channels still present in the compressed outer area 220 of the substrate 121 on account of the capillary effect and closes these openings permanently so that a gas-tight zone 224 results which extends over the entire height of the compressed outer area 220.

As is apparent, in addition, from FIG. 11, the gas-tight electrolyte 126 of the CAE unit 116 extends beyond the edge of the anode 122 permeable to gas and beyond the edge of the cathode 128 permeable to gas and rests with its underside directly on the upper side 226 of the compressed outer area 220 of the substrate 121.

This outer area 232 of the electrolyte 126 arranged directly on the substrate 121 extends towards the edge of the substrate 121 to such an extent outwards that it covers the gas-tight zone 224 and, therefore, the inner area 230 of the substrate 121 is separated in a gas-tight manner from the chamber 130 for oxidizing agent located above the electrolyte 126 without an additional sealing medium being required for this gas-tight separation.

The outer area 232 of the electrolyte 126 thus forms, together with the gas-tight zone 224 of the compressed outer area 220 of the substrate 121, a gas-tight combustible gas chamber seal 218 which separates the chamber 130 for oxidizing agent arranged above the fluid guide frame 120 in a gas-tight manner from the combustible gas chamber 124 arranged beneath the fluid guide frame 120.

In the embodiment of the combustible gas chamber seal 218 illustrated in FIG. 11, this seal is formed by the outer area 232 of the electrolyte 126 guided beyond the anode 122 in the area between the outer edge of the anode 122 and the gas-tight zone 224 of the compressed outer area 220 of the substrate 121.

Alternatively or in addition hereto, it may also be provided for the combustible gas chamber seal 218 to comprise a sealing area which is formed from a filling compound and covers the area from the outer edge of the anode 122 as far as the gas-tight zone 224 in a gas-tight manner.

Such a filling compound can comprise, for example, a solder glass, a solder metal or an inorganic paste.

If the combustible gas chamber seal 218 comprises not only an electrolyte 126 drawn out beyond the gas-tight zone 224 but also a filling compound covering this outer area 232 of the electrolyte 126, a particularly impermeable and reliable sealing of the combustible gas chamber 124 in relation to the chamber 130 for oxidizing agent is achieved.

As is apparent, in particular, from FIG. 7, in the assembled state of a fuel cell unit 114 the CAE unit 116 of the relevant fuel cell 114 rests with the substrate 121 on the contact elements 132a of the contact plate 118 of the fuel cell unit 114 which are on the anode side.

Furthermore, the CAE unit 116 with the compressed outer area 220 of the substrate 121 rests on the fluid guide frame 120 of the same fuel cell unit 114, wherein the uncompressed area of the substrate 121 extends through the opening 176 of the fluid guide frame 120, the substrate 121 is secured to the fluid guide frame 120 as a result of welding or soldering and the fluid guide frame 120 is secured to the contact plate 118 as a result of welding at the welding seam 196 or as a result of soldering of its connecting flange 186 to the connecting flange 170 of the contact plate 118.

The fuel cell units 114 of the composite block of fuel cells 106 are stacked on one another along the stacking direction 112 such that the contact elements 132b of each contact plate 118 on the cathode side extend as far as the cathode of the CAE unit 116 of the fuel cell unit 114 arranged therebelow and abut on the same in electrically conductive contact.

In this respect, the combustible gas openings 142, 182 and the exhaust gas openings 152, 184 are aligned with one another along the stacking direction 112 of consecutive fuel cell units 114 in order to form the combustible gas channels 216 and the exhaust gas channels 214, respectively, in this way.

As is apparent from FIG. 2, a combustible gas supply opening 234, which passes through the lower end plate 108 of the composite block of fuel cells 106 coaxially to the respective combustible gas channel 216, opens into each combustible gas channel 216 at the lower end thereof.

A combustible gas branch line 236 is connected to the end of the combustible gas supply opening 234 facing away from the respective combustible gas channel 216 and this branches off from a combustible gas supply line 238 which is guided through the housing of the fuel cell device 100 in a gas-tight manner and is connected to a combustible gas supply (not illustrated) which feeds a combustible gas, for example, a hydrocarbonaceous gas or pure hydrogen to the combustible gas supply line 238 at an overpressure of, for example, approximately 50 mbar.

The exhaust gas channels 214 of the composite block of fuel cells 106 open at their upper ends into a respective exhaust gas discharge opening 240 (cf. FIG. 3) which is coaxial to the relevant exhaust gas channel 214, passes through the lateral upper end plate 111 and is connected to a respective exhaust gas branch line 242 at its end facing away from the respective exhaust gas channel 214.

These exhaust gas branch lines 242 open into a common exhaust gas discharge line 244 (cf. FIG. 1) which is guided through the housing 102 of the fuel cell device 100 in a gas-tight manner and is connected to an exhaust gas treatment unit (not illustrated).

During operation of the fuel cell device 100, the combustible gas flows through the combustible gas supply line 238, the combustible gas branch lines 236 and the combustible gas supply openings 234 into the two combustible gas channels 216 and is distributed from there through the gas channels 210 of the supporting elements 200 on the side of the combustible gas channels to the combustible gas chambers 124 of the fuel cell units 114 which are each surrounded by the contact plate 118, the fluid guide frame 120 and the CAE unit 116 of the relevant fuel cell unit 114.

As already described, the combustible gas is oxidized at least partially at the anode 122 of the respective CAE units 116 limiting the respective combustible gas chamber 124.

The product of oxidation (water) passes together with superfluous combustible gas out of the combustible gas chambers 124 of the fuel cell units 114 through the gas channels 210 of the supporting elements 200 on the side of the exhaust gas channels into the three exhaust gas channels 214, from which it is discharged through the exhaust gas discharge openings 240, the exhaust gas branch lines 242 and the exhaust gas discharge line 244 to the exhaust gas treatment unit (not illustrated).

As a result of the fact that the number of exhaust gas channels 214 is greater than the number of combustible gas channels 216, a particularly uniform flow through the combustible gas chambers 124 between the rib-like contact elements 132 is achieved and the flow resistance during the flow through the contact field 134 is reduced.

In the exhaust gas treatment unit, the product of reaction (water) is, for example, removed from the stream of exhaust gas and superfluous combustible gas is conducted to the combustible gas supply in order to be supplied to the fuel cell device 100 again.

The oxidizing agent (for example, air or pure oxygen) required for the operation of the fuel cell device 100 is supplied to the interior of the housing 102 through the supply line 104 for oxidizing agent.

In the interior of the housing 102, the oxidizing agent is distributed to the chambers 130 for oxidizing agent which are formed between the combustible gas chambers 124 of the fuel cell units 114 and are surrounded by a respective contact plate 118 of one fuel cell unit 114 as well as by the fluid guide frame 120 and the cathode 128 of the CAE unit 116 of an adjacent fuel cell unit 114.

The oxidizing agent passes into the chambers for oxidizing agent and out of them again through the spaces between a respective fluid guide frame 120 of one fuel cell unit 114 and the contact plate 118 of the fuel cell unit 114 following this in the stacking direction 112 insofar as these spaces are not covered by the supporting elements 200 which surround the combustible gas channels 216 and the exhaust gas channels 214, respectively.

As already described, oxygen ions are formed from the oxidizing agent at the cathodes 128 of the CAE units 116 of the fuel cell units 114 and migrate through the electrolytes 126 to the anodes 122 of the CAE units 116 of the fuel cell units 114.

Superfluous oxidizing agent passes out of the chambers 130 for oxidizing agent of the fuel cell units 114 on the side located opposite the entry side of the oxidizing agent and is removed from the interior of the housing 102 of the fuel cell device 100 through the discharge line 105 for oxidizing agent.

The direction of flow of the combustible gas and the exhaust gas through the fuel cell device 100 is specified in the drawings by single-headed arrows 246, the direction of flow of the oxidizing agent through the fuel cell device 100 by means of double-headed arrows 248.

The direction of flow of the oxidizing agent through the chambers 130 for oxidizing agent is essentially parallel to the direction of flow of the combustible gas through the combustible gas chambers 124.

In order to secure the fuel cell units 114 following one another along the stacking direction 112 on one another by means of outer tensioning, several connecting screws 250 (cf. FIGS. 2 and 3) are provided which pass through bores 252 in the central upper end plate 110 of the composite block of fuel cells 106 and are provided at their ends facing way from the respective screw head 254 with an external thread 256 which is turned into a respective threaded bore 258 in the lower end plate 108 of the composite fuel cells 106 so that the central upper end plate 110 and the lower end plate 108 are tensioned towards one another by the connecting screws 250 and a desired pressing force can be transferred via the end plates 108, 110 to the central area of the stack of fuel cell units 114 comprising the contact fields 134 (cf. FIG. 2).

Furthermore, several connecting screws 260 are provided which pass through bores 262 in the lateral upper end plates 111 of the composite block of fuel cells 106 and are provided at their ends facing away from the respective screw head 264 with an external thread 266 which is turned into a respective threaded bore 268 in the lower end plate 108 so that the lateral upper end plates 111 and the lower end plate 108 are tensioned towards one another by means of the connecting screws 260 and a desired pressing force can be transferred via the end plates 108, 111 to the stack of fuel cell units 114 in the area of the combustible gas channels 216 and the exhaust gas channels 214, respectively.

The pressing force generated by the outer tensioning by means of the connecting screws 250 and the central upper end plate 110 determines the contact pressure, with which the contact elements 132 are pressed against the substrate 121 or against the cathode 128 of the adjacent CAE unit 116.

The contact pressure, with which the supporting elements 200 and the gas channel seals 212 are pressed against the contact plates 118 and the fluid guide frames 120, is determined, on the other hand,—irrespective of the tensioning by means of the connecting screws 250 and the central upper end plate 110—exclusively by the outer biasing force, with which the lateral upper end plates 111 are tensioned towards the lower end plate 108 by means of the connecting screws 260.

The composite block of fuel cells 106 described above is assembled as follows:

First of all, the individual fuel cell units 114 are assembled in that a respective substrate 121 with its compressed outer area 220 is placed on a fluid guide frame 120 and is secured to the fluid guide frame 120 in the manner described above by welding or soldering, thereby forming a gas-tight zone 224 in the compressed outer area 220. Subsequently, the anode 122, the electrolyte 126 and the cathode 128 of the CAE units 116 are generated on the substrate 121, for example, by way of plasma spraying, wherein the electrolyte 126 is generated in such a manner that it covers the gas-tight zone 224 in the compressed outer area 220 of the substrate 121 in a gas-tight manner in order to produce the combustible gas chamber seal 218.

Subsequently, the contact plate 118 of the fuel cell unit 114 is brought into engagement on the side of the substrate 121 facing away from the CAE unit 116 and the connecting flange 170 of the contact plate 118 is connected to the connecting flange 186 of the fluid guide frame 120 in a gas-tight manner by welding or soldering.

Following this, the composite fuel cells 106 is assembled from the individual fuel cell units 114 in that the desired number of fuel cell units 114 is stacked along the stacking direction 112 and the fuel cell units 114 are fixed in their positions relative to one another by means of the end plates 108, 110, 111 and the connecting screws 250, 260 tensioning the end plates towards one another.

Figure 13:
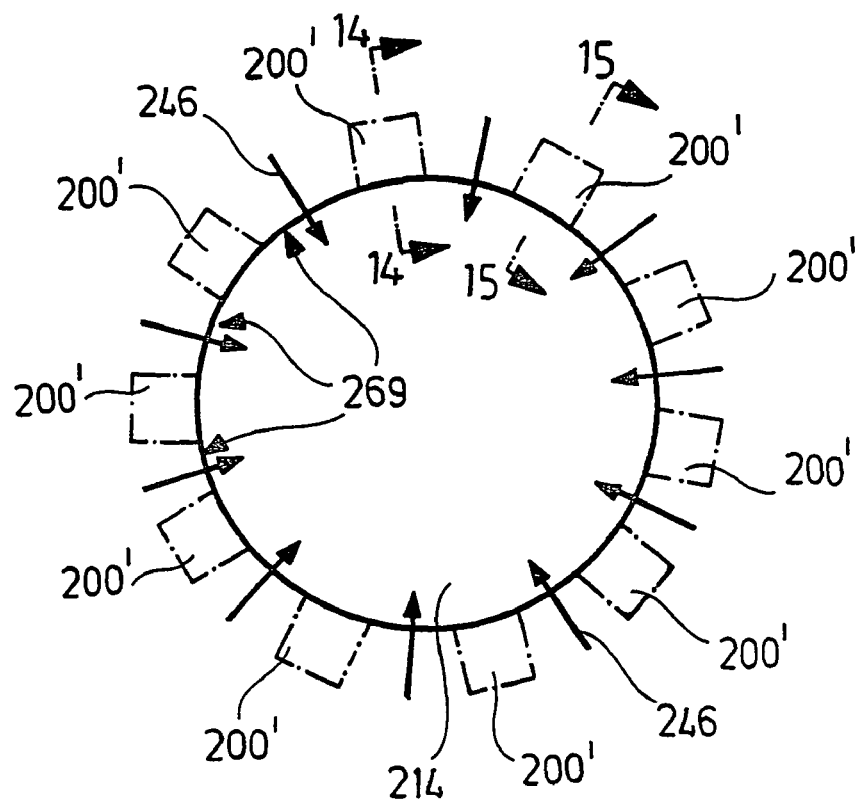
FIG. 13 shows a plan view of the housing of a fuel cell unit in the region of a gas opening in a second embodiment of the fuel cell unit which has a plurality of supporting elements formed in one piece with the housing walls.
Figure 14:
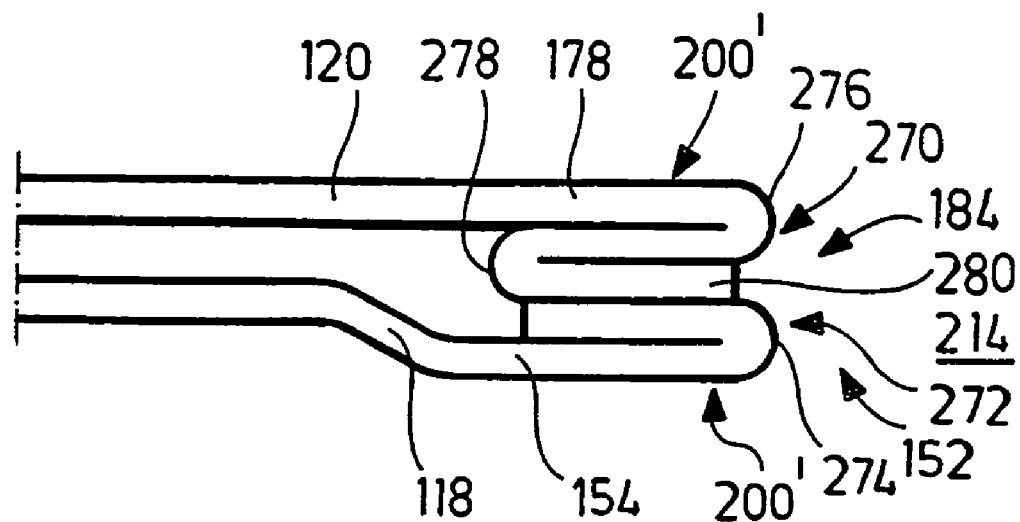
FIG. 14 shows a schematic section through the housing of the fuel cell unit from FIG. 13 along line 14-14 in FIG. 13.
Figure 15:
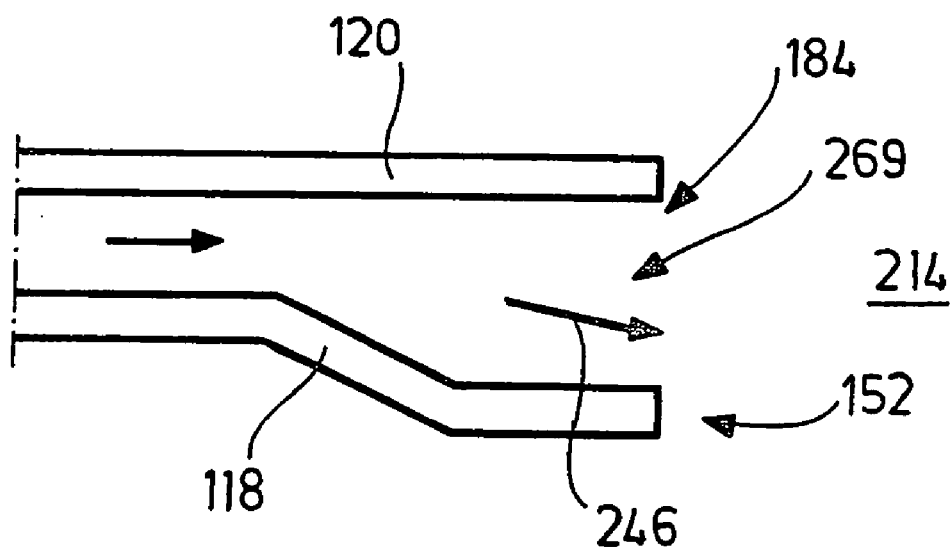
FIG. 15 shows a schematic section through the housing of the fuel cell unit from FIG. 13 along line 15-15 in FIG. 13.

A second embodiment of a fuel cell device 100 illustrated in FIGS. 13 to 15 differs from the first embodiment described above merely due to the fact that supporting elements 200', which are arranged between the contact plate 118 and the fluid guide frame 120 of the same fuel cell unit 114 and, therefore, prevent any collapse of the housing 192 of the fuel cell unit 114 due to the contact pressure, with which the lateral upper end plates 111 and the lower end plate 108 are tensioned towards one another, are not designed as separate components but rather, on the contrary, in one piece with the contact plate 118 or with the fluid guide frame 120.

As is apparent from FIGS. 13 and 14, several, for example, ten supporting elements 200' are arranged around each exhaust gas channel 214 and are spaced from one another in the circumferential direction of the exhaust gas channel 214 so that the exhaust gas from the combustible gas chamber 124 of the relevant fuel cell unit 114 can pass through the spaces between the supporting elements 200' forming the gas passages 269 into the exhaust gas channel 214.

As is best apparent from the sectional illustration of FIG. 14, each of the supporting elements 200' comprises an upper section 270 and a lower section 272, wherein the lower section 272 is formed in one piece with the contact plate 118 and comprises an edge area of the contact plate 118 which projects into the exhaust gas opening 152 and has been bent back through 180° onto the edge area 154 of the contact plate 118 due to bending along a bending line 274.

The upper section 270 of the supporting element 200' is formed in one piece with the fluid guide frame 120 and comprises an edge area of the fluid guide frame 120 which projects into the exhaust gas opening 184, has been bent back through 180° onto the gas guiding area 178 along a first bending line 276 and has been bent back through 180° onto itself along a second bending line 278.

The upper section 270 of the supporting element 200' thus comprises two layers arranged one above the other, wherein the lower layer 280 abuts areally with its underside on the upper side of the lower section 272 of the supporting element 200'.

The, altogether, three sheet-metal layers of the supporting element 200' thus form a solid metallic member which can essentially not be compressed further as a result of the pressing forces acting on the gas channel seals 212 and the supporting elements 200' and, therefore, keeps the contact plate 118 and the fluid guide frame 120 at a distance from one another in the area of the exhaust gas channel 214 and prevents any compression of the housing 192 of the fuel cell unit 114.

Supporting elements corresponding to the supporting elements 200' described above are also arranged in the area of the combustible gas channels 216 between the contact plate 118 and the fluid guide frame 120 of the same fuel cell unit 114.

As for the rest, the second embodiment of a fuel cell device 100 corresponds with respect to construction and function to the first embodiment and reference is made in this respect to its description above.

Figure 16:
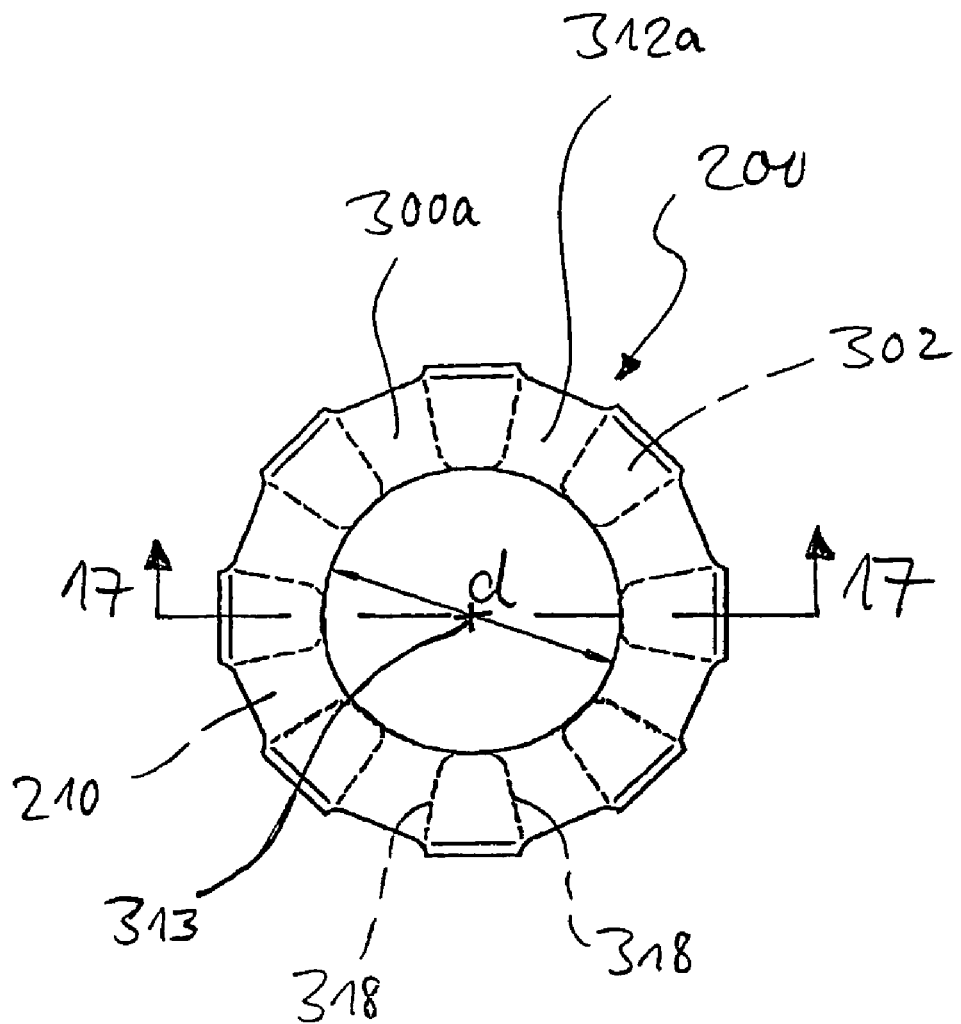
FIG. 16 shows a schematic plan view of an additional embodiment of a ring-shaped supporting element of a fuel cell unit, which surrounds a gas channel and comprises ring-shaped carrier elements and tongues arranged thereon, in the assembled state of the supporting element.
Figure 17:
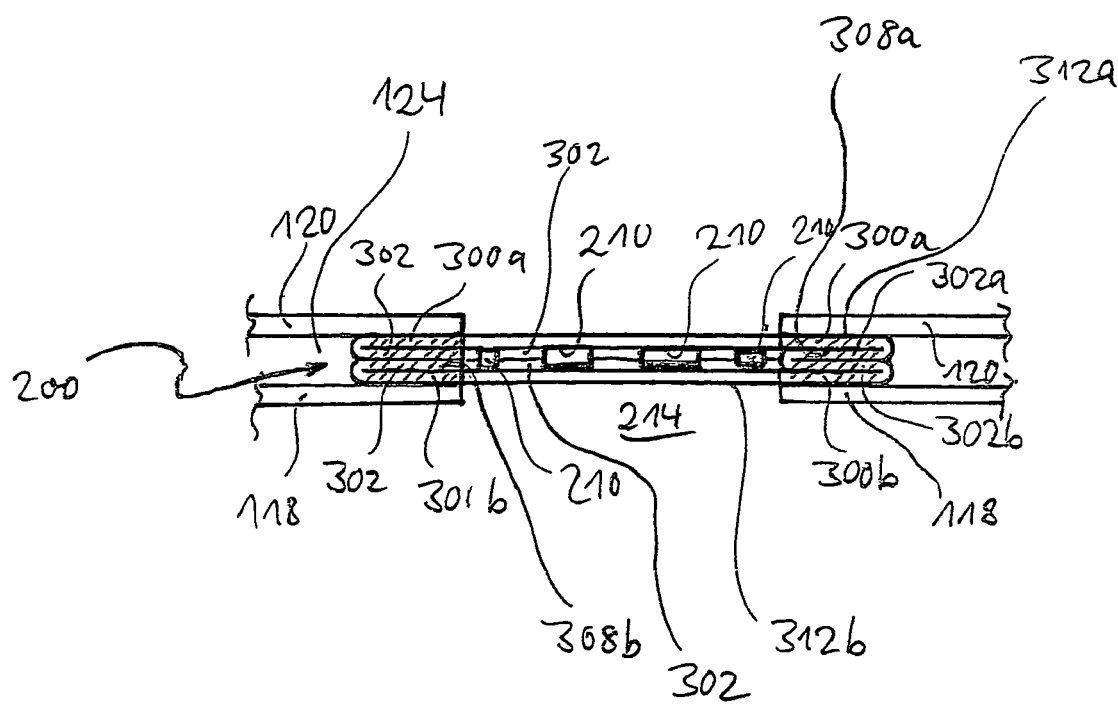
FIG. 17 shows a schematic section through the supporting element from FIG. 16 along line 17-17 in FIG. 16.
Figure 18:
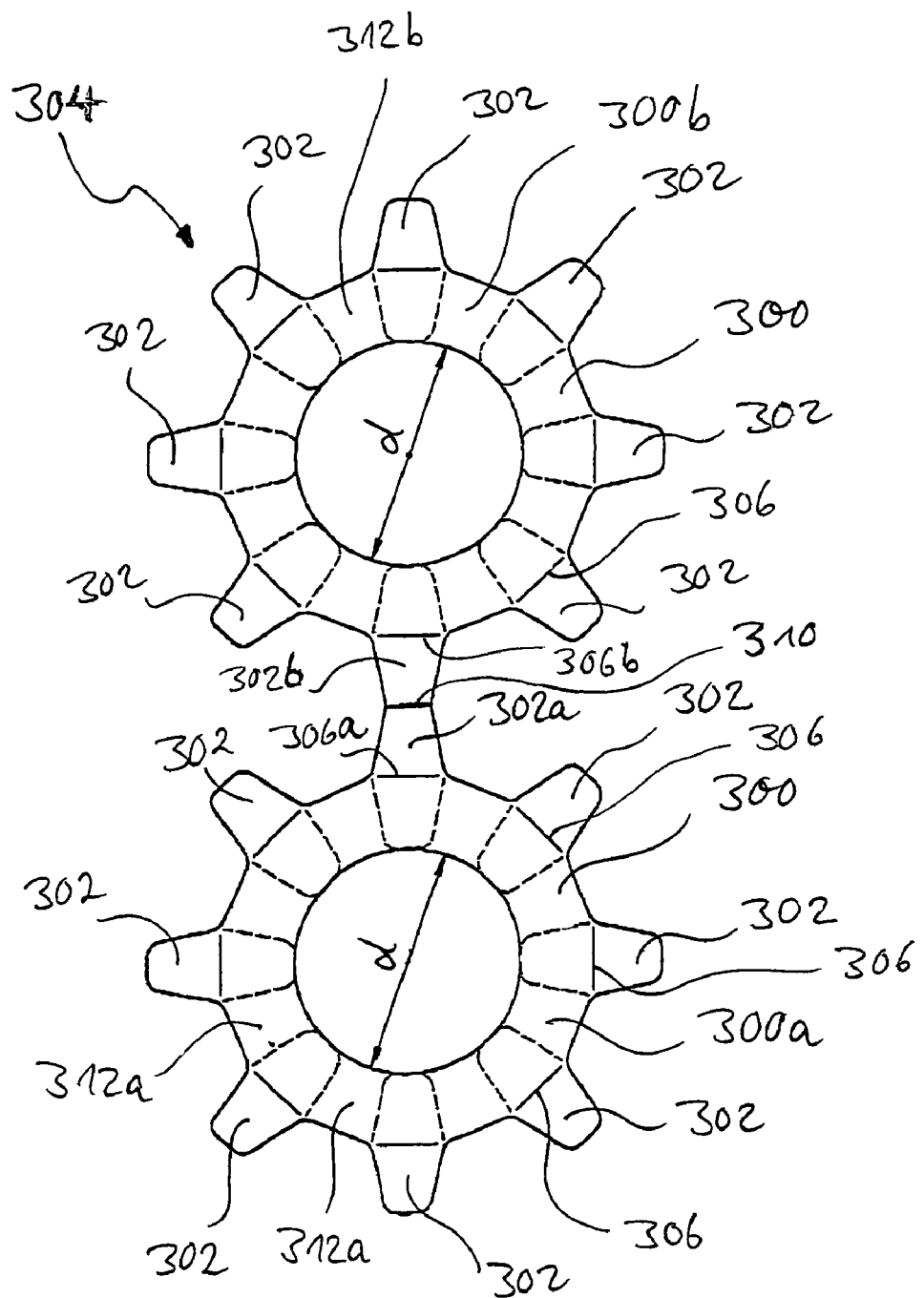
FIG. 18 shows a schematic plan view of a supporting element preform, from which the supporting element illustrated in FIGS. 16 and 17 is formed by way of folding procedures.

A third embodiment of a fuel cell device 100 illustrated in FIGS. 16 to 18 differs from the first embodiment described above only in that the supporting elements 200, which are arranged between the contact plate 118 and the fluid guide frame 120 of the same fuel cell unit 114 and therefore prevent any collapse of the housing 192 of the fuel cell unit 114 due to the contact pressure, with which the lateral upper end plates 111 and the lower end plate 108 are tensioned towards one another, are not designed as solid supporting elements with essentially cylindrical gas channels which are aligned radially but rather are formed from ring-shaped carrier elements 100 and tongues 302 which are formed in one piece with the carrier elements and are folded over onto a surface of the adjacent carrier element 300 prior to the assembly of the respective supporting element 200.

Such a supporting element 200 is formed from the essentially flat supporting element preform 304 which is illustrated in FIG. 18 and is punched or cut from a starting material, for example, from a metallic material, preferably from sheet steel.

The supporting element preform 304 comprises two essentially circular carrier elements 300, the inner ring diameter r of which corresponds to the respective diameter of one of the combustible gas openings 142, 182 or one of the exhaust gas openings 152, 184, depending on whether the supporting element 200 to be produced from the preform is intended to be arranged at a combustible gas channel 216 or at an exhaust gas channel 214.

Several, for example, eight respective tongues 302 project radially outwards from the outer ring side of each carrier element 300. As is apparent from FIG. 18, the tongues 302 narrow towards their free end facing away from the carrier element 300.

Furthermore, tongues 302 adjacent to one another are spaced from one another along the circumference of the carrier element 300.

One of the tongues 302a of the first carrier element 300a is connected at its end facing away from the carrier element 300a to the end of a tongue 302b of the second carrier element 300b facing away from the second carrier element 300b so that the supporting element preform 304 formed from the carrier elements 300 and tongues 302 is designed, altogether, in one piece.

Prior to the assembly of the fuel cell unit 114, the finished supporting element 200 illustrated in FIGS. 16 and 17 is formed from the supporting element preform 304 illustrated in FIG. 18 as a result of bending or folding procedures.

For this purpose, the tongues 302 of the first carrier element 300a are bent downwards through an angle of approximately 180° along the bending lines 306, which extend tangentially to the outer edge of the carrier element and at which these tongues border on the first carrier element 300a, and are folded back onto the underside 308a of the first carrier element 300a.

The tongues 302 of the second carrier element 300b are likewise bent downwards through an angle of approximately 180° along the bending lines 306, at which these tongues border on the second carrier element 300b, and are folded back onto the underside 308b of the second carrier element 300b.

Subsequently, the tongue 302a of the first carrier element 300a is bent downwards through an angle of approximately 180° about the bending line 306a, at which the tongue 302a borders on the first carrier element 300a, and is folded back onto the underside 308a of the first carrier element 300a, wherein the tongue 302b and the second carrier element 300b are also turned through approximately 180°.

Subsequently, the tongue 302b is bent through an angle of approximately 180° along the bending line 310, at which the tongue 302b borders on the tongue 306a, and folded back onto the tongue 302a, wherein the second carrier element 300b is also turned through an angle of approximately 180°.

Finally, the second carrier element 300b is bent downwards through an angle of approximately 180° about the bending line 306b, at which the second carrier element 300b borders on the tongue 302b, and folded back onto the tongue 302b so that the second carrier element 300b comes to rest vertically beneath the first carrier element 300a and the tongues 302 of both carrier elements 300 are arranged between them, as illustrated in FIG. 17.

In this assembled state of the supporting element 200, the side edges 318 of the tongues 302 extend essentially radially to the central axis 313 of the supporting element 200.

As is apparent from FIGS. 16 and 17, gas channels 210 with essentially rectangular cross sections broadening towards the outer side of the supporting element 200 are formed between the tongues 302 of the carrier elements 300 abutting on one another, the height of these channels corresponding to the sum of the heights of two tongues 302 abutting on one another and their width corresponding to the distance between two adjacent tongues 302 along the circumferential direction of the carrier elements 300.

The ring-shaped supporting elements 200 thus formed are arranged during the assembly of a fuel cell unit in the area of the combustible gas openings 142, 182 or in the area of the exhaust gas openings 152, 184 between the contact plate 118 and the fluid guide frame 120 of a housing 192 of a fuel cell unit 114 such that the upper sides 312a, 312b of the carrier elements 300a and 300b, respectively, which face away from one another, abut on the upper side of the contact plate 118 and on the underside of the fluid guide frame 120, respectively.

As a result of the fact that the tongues 302 of one carrier element 300 abut areally on the tongues 302 of an adjacent carrier element 300 of the supporting element 200 and that the tongues 302 each abut areally on one of the carrier elements 300, as homogeneous a distribution as possible of the sealing pressure on the supporting element 200 is brought about in the installed state.

The gas channels 210 which are formed between the tongues 302 facilitate an exchange of gas between the inner ring side and the outer ring side of the supporting element 200 with only a slight flow resistance.

As a result of the selection of the thickness of the starting material, from which the supporting element preform 304 is punched or cut, the overall height of the finished supporting element 200 can be adjusted to any desired value.

Furthermore, it would also be possible to fold the tongues 302 several times each in order to achieve a greater installation thickness of the supporting element 200 in this way.

Moreover, several carrier elements 300 which are not connected to one another in one piece could also be arranged one above the other in order to form the supporting element 200.

Figure 19:
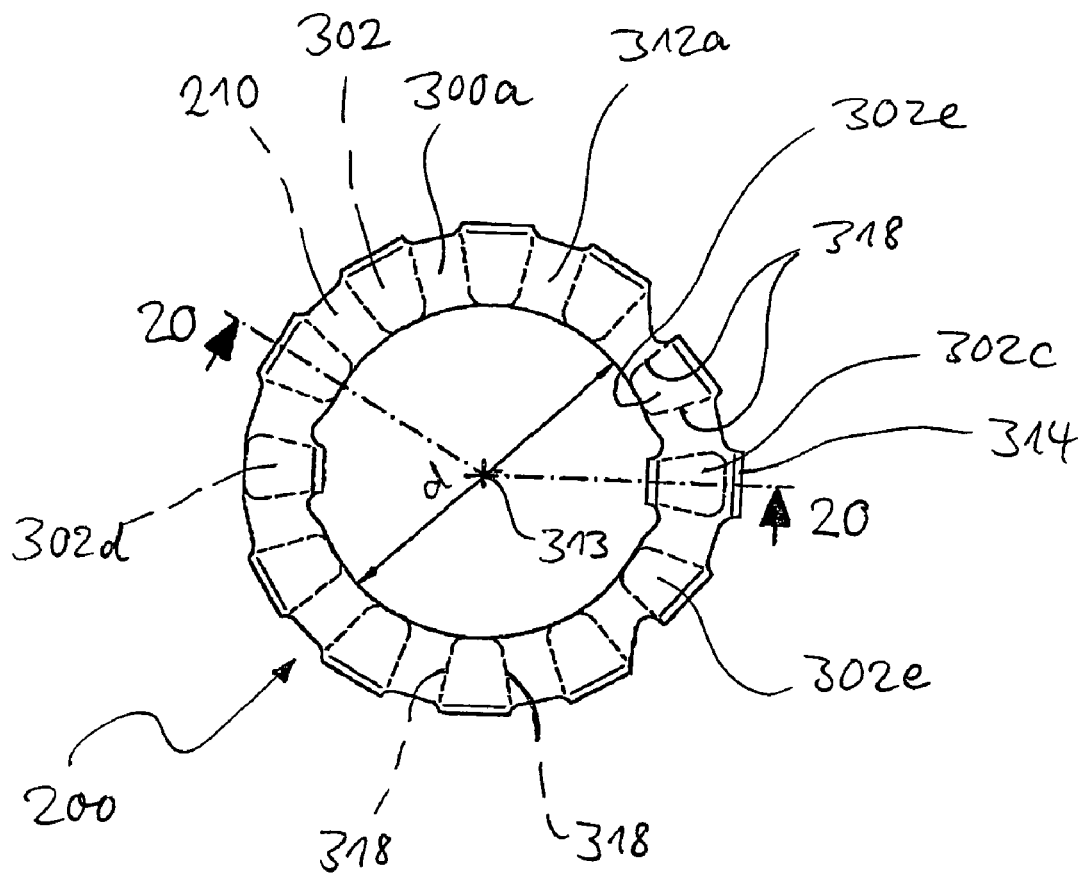
FIG. 19 shows a schematic plan view of an additional embodiment of a ring-shaped supporting element of a fuel cell unit, which surrounds a gas channel and comprises ring-shaped carrier elements with tongues arranged thereon, in an assembled state of the supporting element.
Figure 20:
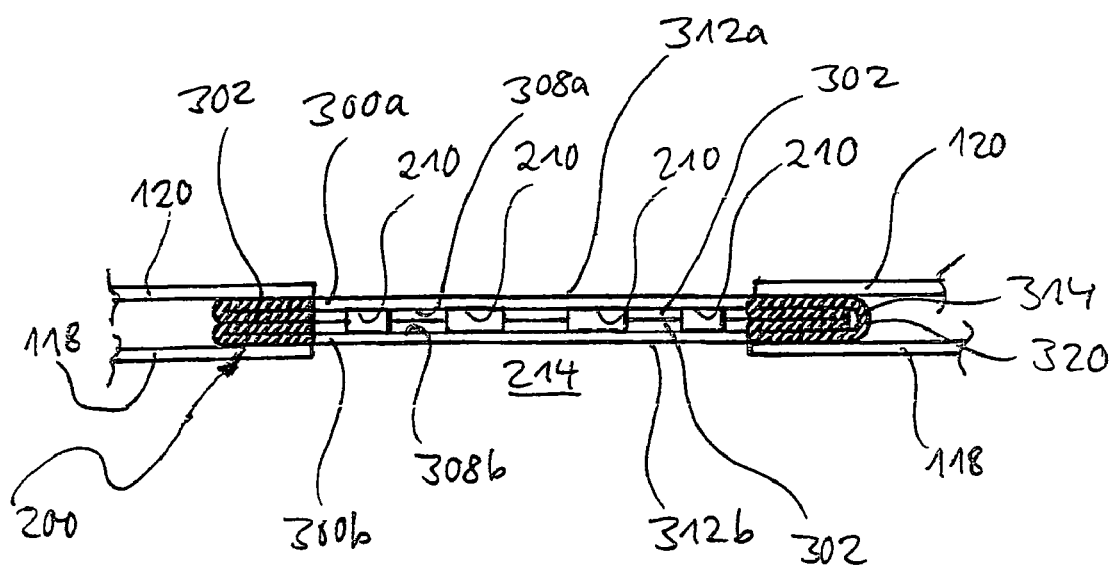
FIG. 20 shows a schematic section through the supporting element from FIG. 19 along line 20-20 in FIG. 19.
Figure 21:
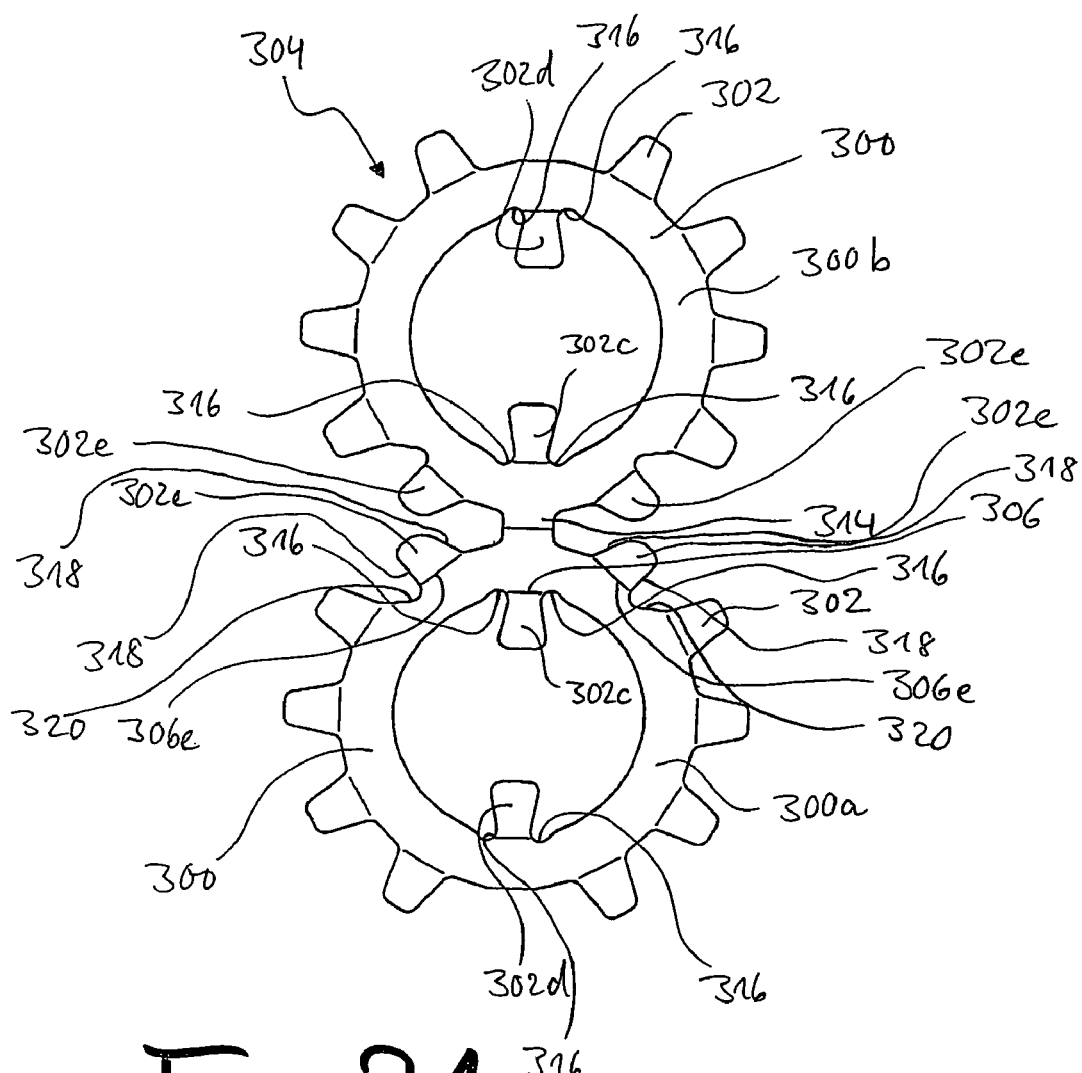
FIG. 21 shows a schematic plan view of a supporting element preform, from which the supporting element illustrated in FIGS. 19 and 20 is formed by way of folding procedures.

An alternative embodiment of a supporting element 200 is illustrated in FIGS. 19 to 21.

As is best apparent from the plan view illustrated in FIG. 21 of the supporting element preform 304 punched or cut from a layer of the starting material, this alternative embodiment also comprises two essentially circular carrier elements 300a, 300b which are provided on their respective outer ring sides with several, for example, with ten tongues 302 each.

Furthermore, the outer ring sides of the carrier elements 300a, 300b are connected to one another via a web area 314 aligned radially to the two carrier elements.

A respective inner tongue 302c is provided at the point of the inner ring side of each carrier element 300a, 300b which is located opposite the web area 314, the inner tongue tapering from its free end facing away from the respective carrier element 300a, 300b towards the respective carrier element 300a, 300b.

A respective recess 316 is provided on either side of the inner tongue 302c at the inner ring side of the relevant carrier element 300a, 300b and one end of the bending line 306 of the inner tongue 302c runs into each recess. The bending line of the inner tongue 302c is cut free in this way so that the inner tongue 302c can be bent about the bending line 306 and folded back onto the relevant carrier element 300a, 300b.

A respective, additional, inner tongue 302d is provided at the point of the inner ring side which is located diametrically opposite the inner tongue 302c on the inner ring side of the carrier element 300a, 300b, this additional inner tongue being formed and arranged symmetrically to the first inner tongue 302c (with respect to the central axis of the respective carrier element 300a, 300b).

In order to prevent the two outer tongues 302e of the one carrier element adjacent to the web area 314 from touching the corresponding, outer tongues 302e of the other carrier element, these outer tongues 302e are not aligned exactly radial to the central axis of the respective carrier element 300a, 300b but are rather tilted away from the web area 314 in relation to the radial direction. So that it is possible, after these outer tongues 302e have been folded back onto the respective carrier element 300a, 300b, for the side edges 318 of the outer tongues 302e to extend radially in relation to the central axis of the supporting element 200, the bending lines 306e, about which the outer tongues 302e are folded, do not extend at right angles to the radial direction of the respective carrier element 300a, 300b but rather at an acute angle in relation to the tangential direction at the outer ring side of the relevant carrier element.

In order to facilitate the folding of the outer tongue 302e about this bending line 306e which is not aligned tangentially to the carrier element 300a and 300b, respectively, a recess 320, into which the bending line 306e runs, is provided at the outer ring side of the relevant carrier element between the outer tongue 302e and the outer tongue 302 which is adjacent to the same on the side facing away from the web area 314.

In order to form the supporting element 200 from the supporting element preform 304 illustrated in FIG. 21, all the tongues 302, 302c, 302d, 302e are, first of all, bent about their respective bending lines through an angle of approximately 180° and folded back onto the underside 308a, 308b of the respective carrier element 300a, 300b.

Subsequently, the web area 314 is bent between the two carrier elements such that it forms an arc 320 with a U-shaped cross section (cf. FIG. 20), whereby the second carrier element 300b with the tongues 302 arranged thereon is moved at right angles under the first carrier element 300a.

As a result, the final configuration of the supporting element 200 illustrated in FIGS. 19 and 20 is reached, in which the undersides 308a, 308b of the two carrier elements 300a, 300b face one another, the tongues 302, 302c, 302d, 302e arranged on the carrier elements are arranged between the carrier elements 300a, 300b and abut areally on the respective carrier element as well as areally on a respective tongue of the respectively other carrier element.

The radial gas channels 210 of the supporting element 200 are formed between adjacent stacks of tongues.

As for the rest, this alternative embodiment of a supporting element corresponds to the embodiment illustrated in FIGS. 16 to 18 and in this respect reference is made to its description above.

Figure 22:
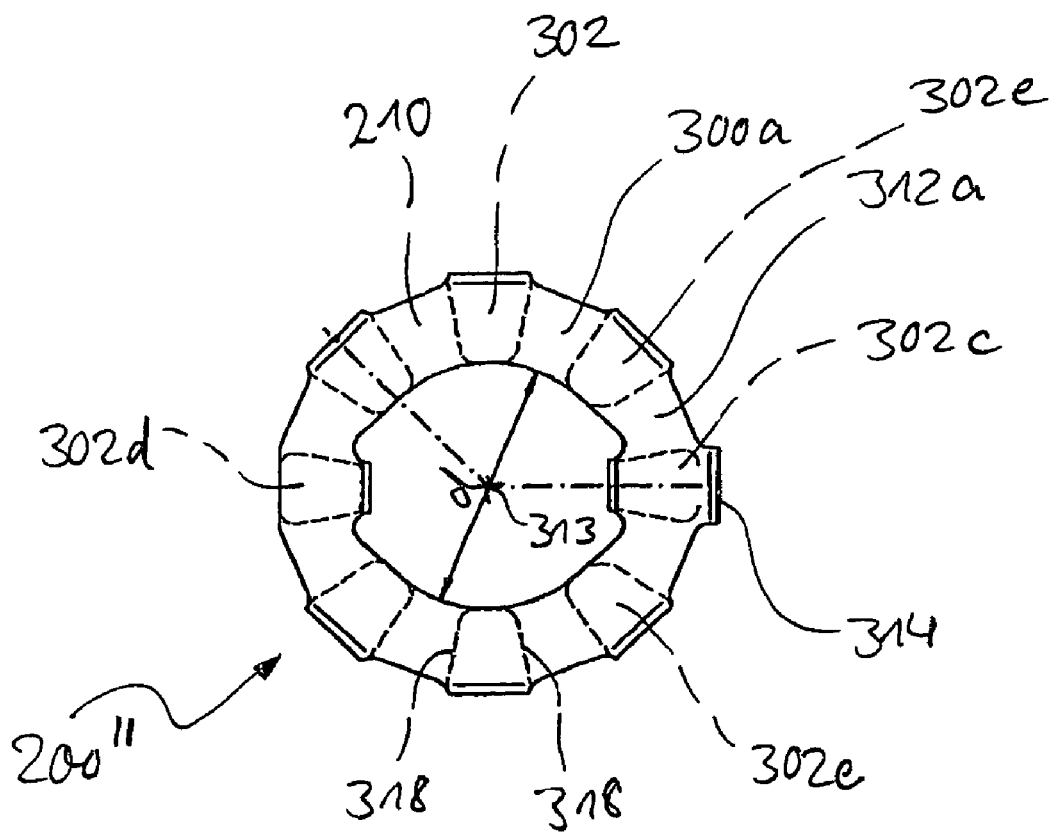
FIG. 22 shows a schematic plan view of an additional embodiment of a ring-shaped supporting element of a fuel cell unit, which surrounds a gas channel and comprises two ring-shaped carrier elements and tongues arranged thereon, in an assembled state of the supporting element.
Figure 23:
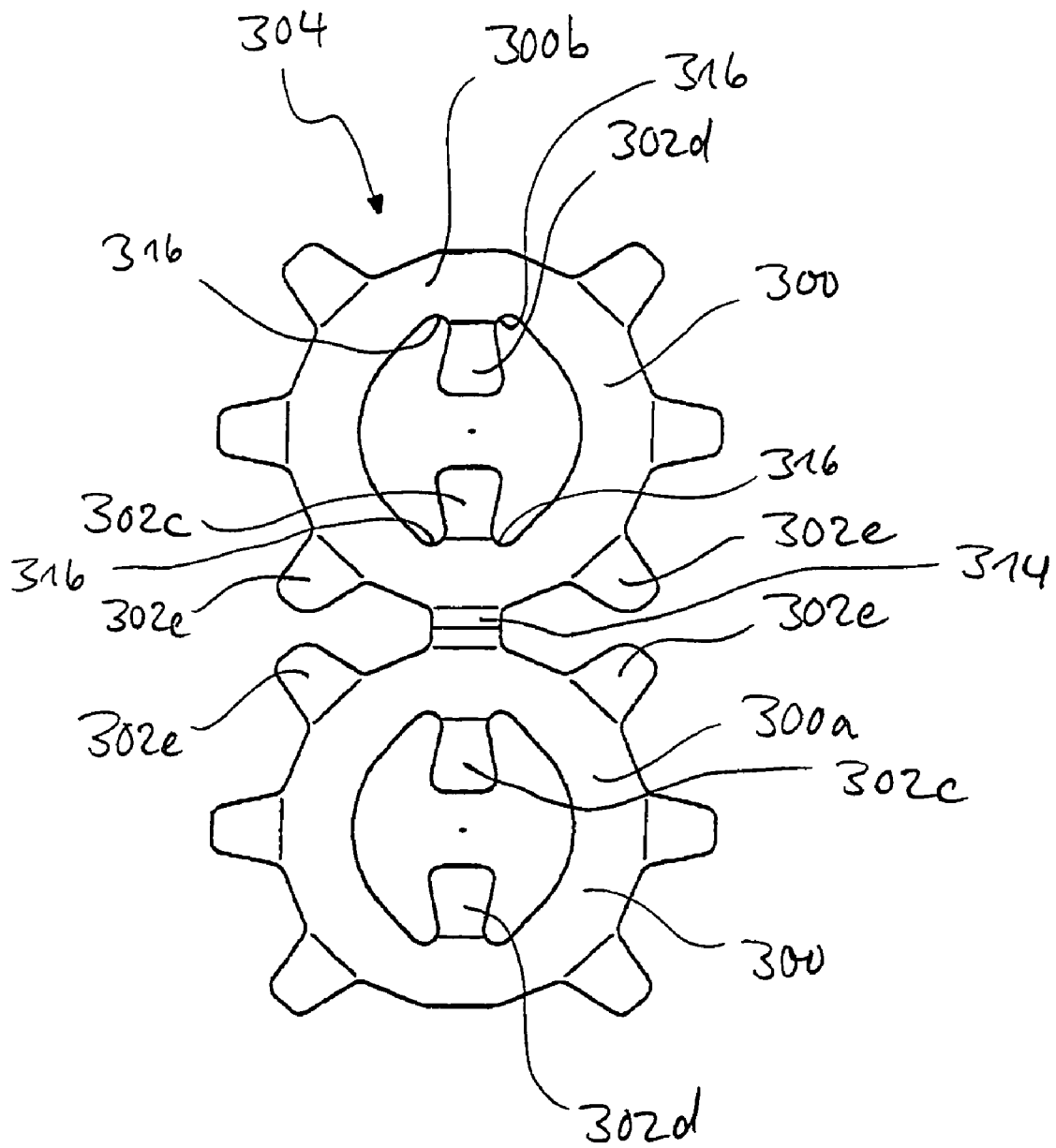
FIG. 23 shows a schematic plan view of a supporting element preform, from which the supporting element illustrated in FIG. 22 is formed by way of folding procedures.

An additional embodiment of a supporting element 200" illustrated in FIGS. 22 and 23 differs from the embodiment illustrated in FIGS. 19 to 21 only in that the carrier elements 300a, 300b in this additional embodiment have a smaller inner ring diameter and a smaller outer ring diameter. Furthermore, only six instead of ten outer tongues 302 are arranged on each carrier element 300 in this additional embodiment.

Since the outer tongues 302e adjacent to the web area 314 between the carrier elements 300 also have a greater angular distance from the web area 314 than in the embodiment described above, these outer tongues 302e can also be aligned essentially radial to the central axis of the relevant carrier element 300 so that it is unnecessary to provide a recess 320 at the outer ring side of the carrier elements 300.

As for the rest, the embodiment of a supporting element 200" illustrated in FIGS. 22 and 23 corresponds with respect to construction and function to the embodiment illustrated in FIGS. 19 to 21 and in this respect reference is made to its description above.

In order to simplify the production of the housing 192 of a fuel cell unit 114 and save on material, it may be provided for the supporting elements 200, 200" described above to be connected in one piece to one of the two housing walls, i.e., to the contact plate 118 or to the fluid guide frame 120.

For this purpose, the supporting element preform 304 of the relevant supporting element is connected via a web 322 to the relevant housing section.

Figure 24:
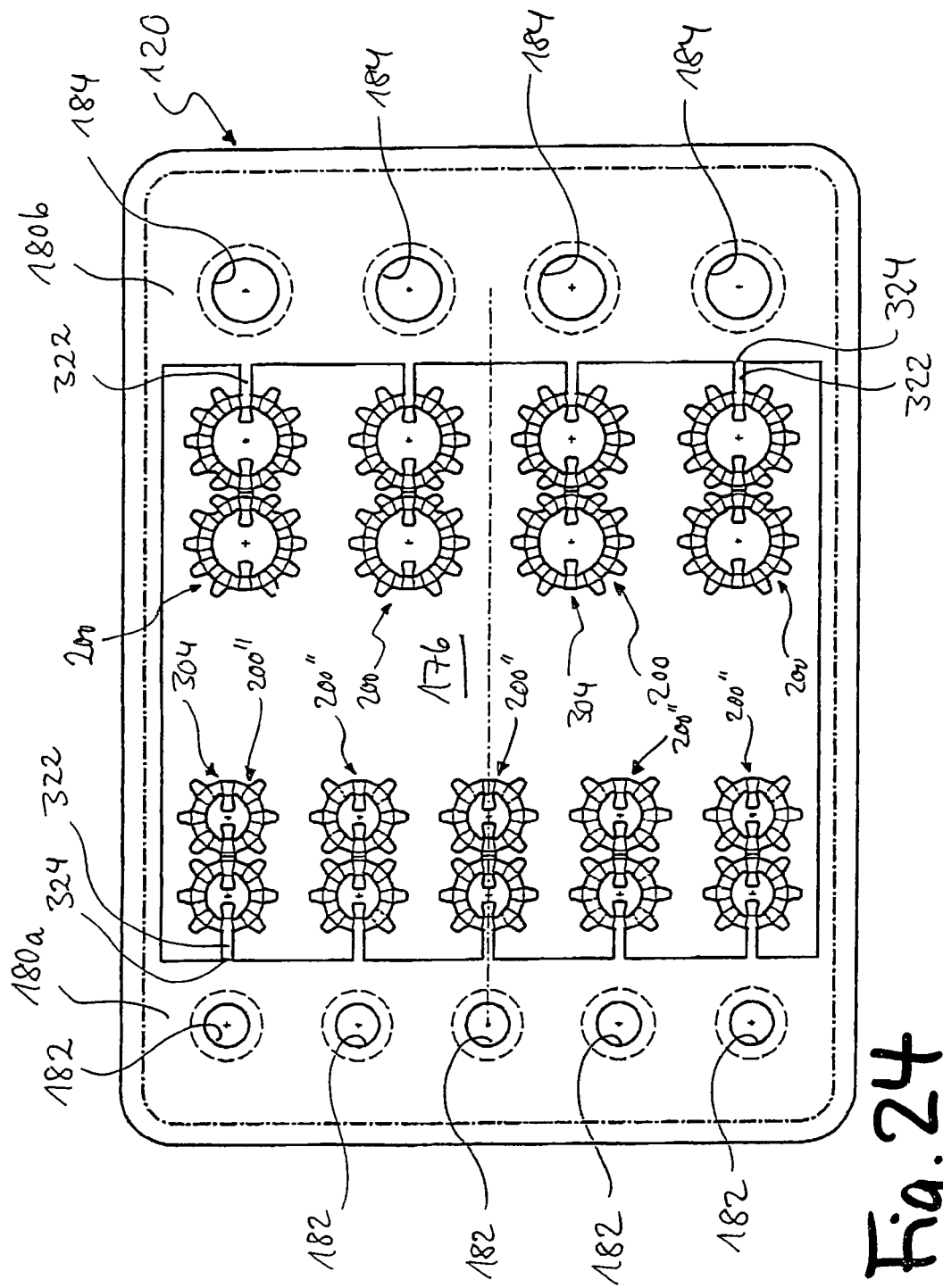
FIG. 24 shows a schematic plan view of a fluid guide frame of a fuel cell unit with supporting element preforms attached to the fluid guide frame.

A fluid guide frame 120 is illustrated, for example, in FIG. 24 which has in its left-hand side area 180a five combustible gas openings 182 with a diameter $d_1$ and in its right-hand side area 180b four exhaust gas openings 184 with a diameter $d_2$, wherein the diameter $d_2$ is greater than the diameter $d_1$.

The supporting element preforms 304 of five supporting elements 200" for the combustible gas openings 182 and of four supporting elements 200 for the exhaust gas openings 184, which are connected in one piece to the side areas 180a and 180b, respectively, of the fluid guide frame 120 by means of webs 322, are arranged in the area of the central opening 176 of the fluid guide frame 120.

The length of a web 322 corresponds to the distance between the respective combustible gas opening 182 or exhaust gas opening 184 and the opening 176, minus the ring width of the carrier elements 300 of the relevant supporting element 200" and 200, respectively.

The supporting element preforms 304 are punched or cut together with the fluid guide frame 120 from a layer of the starting material, for example, from sheet steel.

Subsequently, the supporting elements 200" and 200, respectively, are generated in the manner described above from the supporting element preforms 304 by way of bending and folding procedures.

Finally, the supporting elements 200" and 200, respectively, thus generated are brought into their final position by folding the webs 322 through an angle of approximately 180° about their bending lines 324 extending along the edges of the opening 176. In this final position, the supporting elements 200", 200 are arranged coaxially to the respectively associated combustible gas opening 182 or exhaust gas opening 184 (this final position is indicated in FIG. 24 by the dashed circular lines which concentrically surround the combustible gas openings 182 and the exhaust gas openings 184, respectively).

By attaching the supporting element preforms 304 to one of the housing sections of the housing 192 of a fuel cell unit 114 it is possible to produce the supporting elements 200" and 200, respectively, simply by means of punching and bending operations in a follow-on composite tool and to arrange them undetachably at the correct position in the area of the combustible gas channels and exhaust gas channels, respectively, without any elements needing to be produced separately from the housing section and, subsequently, connected to the housing section.

As already explained above, it is, however, also possible to produce the supporting elements 200" and 200, respectively, from supporting element preforms which are punched out separately from the housing sections and can each comprise one or also several connected carrier elements 300.

The present disclosure relates to the subject matters contained in the German patent application No. 101 35 334.0 of Apr. 23, 2001 and the European patent application of the same applicant dated Apr. 23, 2002, the priority of which is likewise claimed, the description, claims and drawings of these applications being made part of this application by reference (incorporation by reference).

The invention claimed is:

1. Fuel cell unit, comprising a housing limiting at least one gas chamber and having a gas opening in a first housing wall and a gas opening in a second housing wall located opposite the first housing wall, and at least one supporting element arranged between the first housing wall and the second housing wall and keeping the first housing wall and the second housing wall at a distance from one another, wherein said gas chamber is in fluid communication with at least one of said gas openings in the first housing wall and the second housing wall via said supporting element, and wherein at least one part of the supporting element is formed by a single or multiple bending of an edge area of the gas opening provided in the first housing wall or of an edge area of the gas opening provided in the second housing wall.

2. Fuel cell unit as defined in claim 1, wherein the supporting element is configured so as to be closed in the shape of a ring and is provided with gas openings.

3. Fuel cell unit as defined in claim 1, wherein the supporting element comprises at least two channel limiting elements, a gas channel of the supporting element being formed between said channel limiting elements, and at least one carrier element, the channel limiting elements abutting on said carrier element in the assembled state of the supporting element and said carrier element forming an edge of the gas channel.

4. Fuel cell unit as defined in claim 1, wherein the supporting element comprises at least one carrier element and at least one tongue formed in one piece with the carrier element, said tongue being bent out of the plane of the carrier element in the assembled state of the supporting element, and wherein the carrier element is configured as an essentially flat plate.

5. Fuel cell unit as defined in claim 1, wherein the supporting element comprises at least one carrier element and at least one tongue formed in one piece with the carrier element, said tongue being bent out of the plane of the carrier element in the assembled state of the supporting element, and wherein the at least one tongue abuts on the carrier element in the assembled state of the supporting element.

6. Fuel cell unit as defined in claim 1, wherein the supporting element comprises at least one carrier element and at least one tongue formed in one piece with the carrier element, said tongue being bent out of the plane of the carrier element in the assembled state of the supporting element, and wherein the at least one tongue forms an edge of a gas opening of the supporting element in the assembled state of the supporting element.

7. Fuel cell unit as defined in claim 1, wherein the supporting element comprises at least one carrier element and at least one tongue formed in one piece with the carrier element, said tongue being bent out of the plane of the carrier element in the assembled state of the supporting element, and wherein the at least one carrier element is provided with several tongues.

8. Fuel cell unit as defined in claim 1, wherein the supporting element comprises at least one carrier element and at least one tongue formed in one piece with the carrier element, said tongue being bent out of the plane of the carrier element in the assembled state of the supporting element, and wherein the carrier element comprises a closed ring.

9. Fuel cell unit as defined in claim 8, wherein at least one tongue is arranged on the inner ring side of the carrier element.

10. Fuel cell unit as defined in claim 8, wherein at least one tongue is arranged on the outer ring side of the carrier element.

11. Fuel cell unit as defined in claim 1, wherein the supporting element comprises at least one carrier element and at least one tongue formed in one piece with the carrier element, said tongue being bent out of the plane of the carrier element in the assembled state of the supporting element, and wherein the supporting element comprises at least two carrier elements.

12. Fuel cell unit as defined in claim 11, wherein the at least two carrier elements are connected to one another in one piece.

13. Fuel cell unit as defined in claim 12, wherein the at least two carrier elements are connected to one another via an area bent in the assembled state of the supporting element.

14. Fuel cell unit as defined in claim 12, wherein the supporting element comprises a first carrier element with a first tongue and a second carrier element with a second tongue, wherein the first tongue and the second tongue border on one another.

15. Fuel cell unit as defined in claim 11, wherein the tongues of at least two carrier elements abut on one another in the assembled state of the supporting element.

16. Fuel cell unit as defined in claim 1, wherein the supporting element comprises at least one carrier element and at least one tongue formed in one piece with the carrier element, said tongue being bent out of the plane of the carrier element in the assembled state of the supporting element, and wherein at least one carrier element is formed in one piece with one of the housing walls.

17. Fuel cell unit as defined in claim 1, wherein the supporting element comprises a part separate from the housing walls.

18. Fuel cell unit as defined in claim 1, wherein a plurality of supporting elements is provided, gas passages being formed between said supporting elements.

19. Fuel cell unit as defined in claim 1, wherein the supporting element comprises a metallic material.

20. Fuel cell unit as defined in claim 1, wherein at least one part of the supporting element is formed in one piece with the first housing wall.

21. Fuel cell unit as defined in claim 1, wherein at least one part of the supporting element is formed in one piece with the second housing wall.

22. Composite block of fuel cells, comprising a plurality of fuel cell units as defined in claim 1, said fuel cell units following one another along a stacking direction.

23. Composite block of fuel cells as defined in claim 22, comprising a tensioning device for tensioning the areas of the housing of the fuel cell units having the gas openings towards one another.

24. Composite block of fuel cells as defined in claim 23, comprising an additional tensioning device for tensioning additional areas of the housing of the fuel cell units towards one another independently of the tensioning of the areas of the fuel cell units having the gas openings.

25. Composite block of fuel cells as defined in claim 24, comprising a plurality of cathode-anode-electrolyte units and a plurality of contact plates, wherein the cathode-anode-electrolyte units and the contact plates are adapted to be tensioned towards one another by means of the additional tensioning device, said contact plates being in electrically conductive contact with the cathode-anode-electrolyte units.

26. Fuel cell unit as defined in claim 1, wherein said distance between the first housing wall and the second housing wall is smaller than the extent of said supporting element in a direction parallel to the first housing wall and the second housing wall.

27. Fuel cell unit as defined in claim 26, wherein said distance between the first housing wall and the second housing wall is smaller than the extent of said supporting element in every direction parallel to the first housing wall and the second housing wall.

28. Composite block of fuel cells as defined in claim 22, comprising at least one gas-tight sealing element which is provided between the second housing wall of a first fuel cell unit and the first housing wall of a second fuel cell unit, in the area of said gas openings in said first housing wall and said second housing walls.

29. Composite block of fuel cells as defined in claim 28, wherein said at least one sealing element is a flat seal.

30. Composite block of fuel cells as defined in claim 22, comprising at least one gas channel extending from a first fuel cell unit to at least a second fuel cell unit through said gas openings in the first and second housing wall, wherein said at least one gas channel extends along a direction which is essentially parallel to said stacking direction of said first housing wall and said second fuel cell units.

31. Composite block of fuel cells as defined in claim 30, wherein said gas channel has a combustible gas flowing through it during operation of said composite block of fuel cell units.

* * * * *